US012632215B2

(12) United States Patent
Nakashima

(10) Patent No.: US 12,632,215 B2
(45) Date of Patent: May 19, 2026

(54) RECORDING MEDIUM, INFORMATION PROCESSING APPARATUS, AND INFORMATION PROCESSING METHOD

(71) Applicant: Akihiro Nakashima, Kanagawa (JP)

(72) Inventor: Akihiro Nakashima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 247 days.

(21) Appl. No.: 18/521,039

(22) Filed: Nov. 28, 2023

(65) Prior Publication Data

US 2024/0184514 A1     Jun. 6, 2024

(30) Foreign Application Priority Data

Dec. 2, 2022     (JP) ................................. 2022-193781

(51) Int. Cl.
*G06F 3/16*          (2006.01)
*G06F 3/04847*     (2022.01)
*G10L 15/26*        (2006.01)

(52) U.S. Cl.
CPC .......... *G06F 3/165* (2013.01); *G06F 3/04847* (2013.01); *G10L 15/26* (2013.01)

(58) Field of Classification Search
None
See application file for complete search history.

(56) References Cited

U.S. PATENT DOCUMENTS

2019/0130629 A1*   5/2019   Chand .................. G06V 40/172
2020/0175991 A1*   6/2020   Mano ...................... G11B 27/28
2022/0277505 A1*   9/2022   Baszucki .............. G06T 13/205

FOREIGN PATENT DOCUMENTS

JP          2020-095689       6/2020
JP              7103681       7/2022

* cited by examiner

*Primary Examiner* — Tuan S Nguyen
(74) *Attorney, Agent, or Firm* — IPUSA, PLLC

(57) ABSTRACT

A non-transitory computer-readable recording medium stores a program that causes a computer to execute a process performed in an information processing apparatus that plays back voice data, the process including receiving, from a user, an operation of specifying a playback position of the voice data; and displaying a text of a voice to be played back from the playback position, based on the operation of specifying the playback position.

12 Claims, 24 Drawing Sheets

RECORD BIBLIOGRAPHIC INFORMATION

RECORD ID: 00005007

RECORD ID: 00005006

| RECORD NAME | PERFORMANCE REPORTING MEETING |
| PARTICIPANT | Mr. XX, Mrs. XXX, ・・・ |
| CONFERENCE MEMO | ◆OVERVIEW ・・・・・ |
| START DATE AND TIME | 2021/03/31 11:00:00 |
| END DATE AND TIME | 2021/03/31 12:00:00 |
| VOICE DATA PATH | https://・・・/00005006.mp3 |
| USER ID | user01 |
| CONFERENCE URL | https://・・・/00005006 |
| ・・・ | ・・・ |

FIG.6

RECORD ID: 00005007

RECORD ID: 00005006

TEXT INFORMATION

| TEXT ID | START TIME | END TIME | TEXT | BOOKMARK | VOICE DATA PATH | EDITED TEXT |
|---|---|---|---|---|---|---|
| 0005 | 11:01:53 | 11:01:58 | TODAY'S MEETING WILL BE RECORDED. | OFF | .../0005006/0005.mp3 | |
| 0006 | 11:01:59 | 11:02:02 | TODAY'S AGENDA IS THE PERFORMANCE OF HEALTH CARE BUSINESS AND OFFICE SERVICE BUSINESS. | ON | .../0005006/0006.mp3 | |
| 0007 | 11:02:05 | 11:02:12 | FIRST, THE HEALTH CARE BUSINESS. | OFF | .../0005006/0007.mp3 | |
| 0086 | 11:31:05 | 11:31:09 | NEXT, THE OFFICE SERVICE BUSINESS. | ON | .../0005006/0086.mp3 | |
| 0087 | 11:31:10 | 11:31:11 | YES. | OFF | .../0005006/0087.mp3 | |
| 0088 | 11:31:12 | 11:31:21 | THE SECOND-HALF SALES IN 2020 OF THE OFFICE SERVICE BUSINESS IS○○○. | OFF | .../0005006/0088.mp3 | |
| 0089 | 11:31:22 | 11:31:25 | THE OPERATING PROFIT WAS △△△, BUT □□□ | OFF | .../0005006/0089.mp3 | |
| ... | ... | ... | ... | ... | ... | ... |

FIG.7

CAPTURED IMAGE INFORMATION

RECORD ID: 00005007

RECORD ID: 00005006

| IMAGE ID | ACQUISITION TIME | IMAGE PATH |
|---|---|---|
| 0003 | 11:01:30 | ・・・/00005006/0003.jpg |
| 0004 | 11:02:00 | ・・・/00005006/0004.jpg |
| 0062 | 11:31:00 | ・・・/00005006/0062.jpg |
| | | |

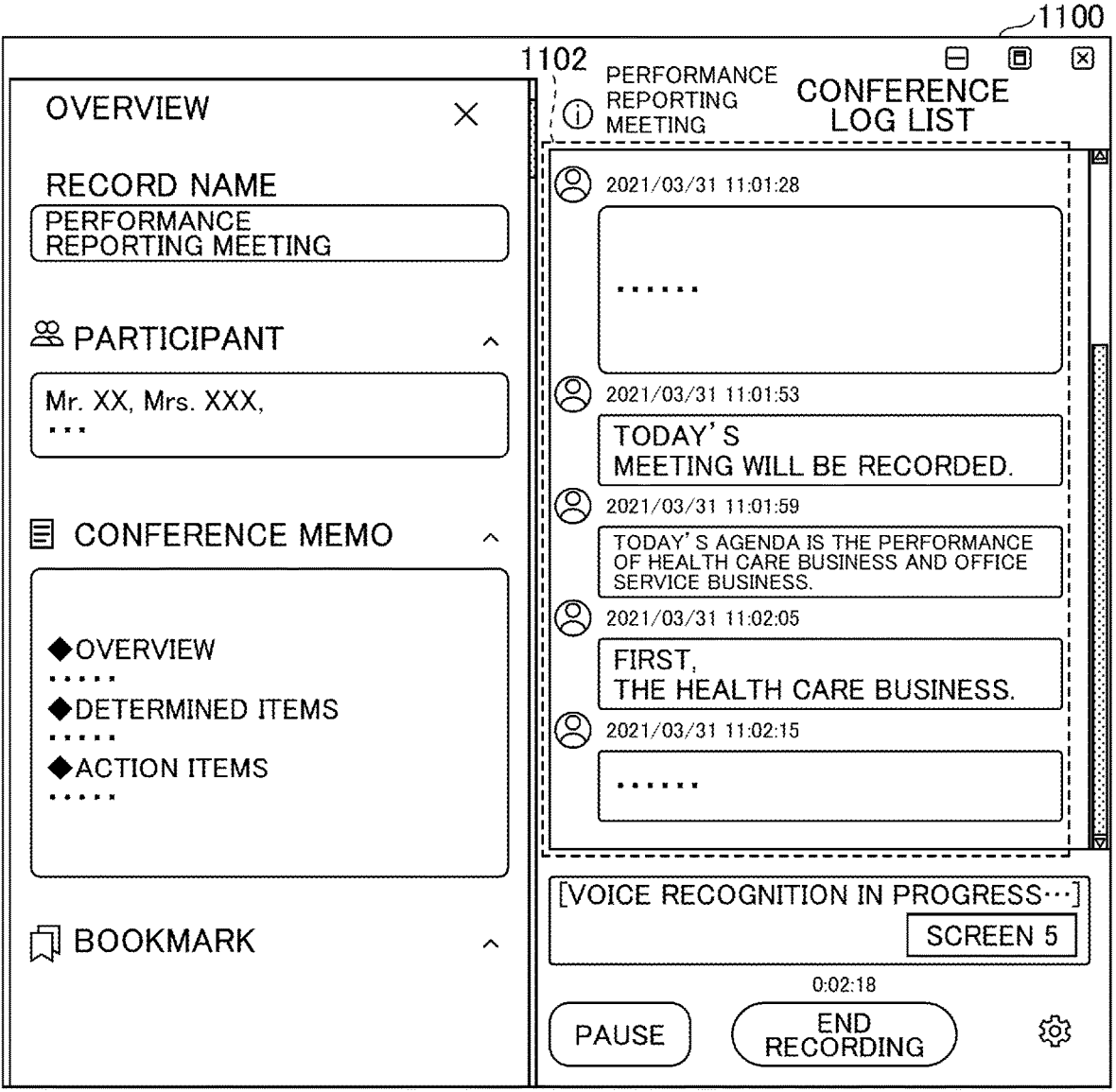

1100

1102

OVERVIEW        ✕

RECORD NAME

PERFORMANCE
REPORTING MEETING

⚇ PARTICIPANT        ⌃

Mr. XX, Mrs. XXX,
• • •

▤ CONFERENCE MEMO        ⌃

◆OVERVIEW
• • • • •
◆DETERMINED ITEMS
• • • • •
◆ACTION ITEMS
• • • • •

🔖 BOOKMARK        ⌃

ⓘ PERFORMANCE
REPORTING
MEETING        CONFERENCE
LOG LIST        ⊟ ▢ ⊠

2021/03/31 11:01:28

• • • • • •

2021/03/31 11:01:53

TODAY'S
MEETING WILL BE RECORDED.

2021/03/31 11:01:59

TODAY'S AGENDA IS THE PERFORMANCE
OF HEALTH CARE BUSINESS AND OFFICE
SERVICE BUSINESS.

2021/03/31 11:02:05

FIRST,
THE HEALTH CARE BUSINESS.

2021/03/31 11:02:15

• • • • • •

[VOICE RECOGNITION IN PROGRESS···]

SCREEN 5

0:02:18

PAUSE        END
RECORDING        ⚙

FIG.12

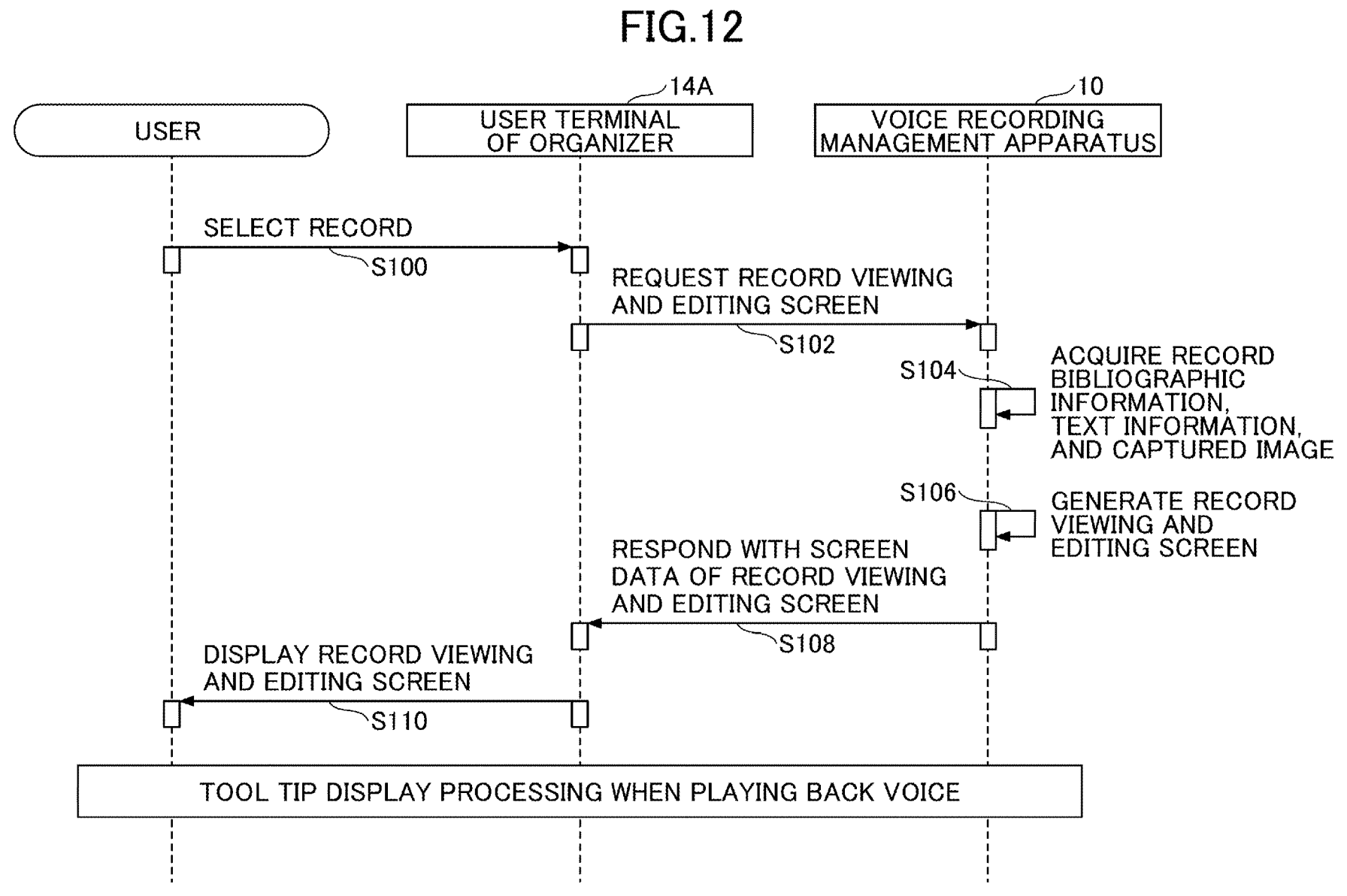

VOICE RECORDING MANAGEMENT APPARATUS 10

USER TERMINAL OF ORGANIZER 14A

USER

SELECT RECORD S100

REQUEST RECORD VIEWING AND EDITING SCREEN S102

ACQUIRE RECORD BIBLIOGRAPHIC INFORMATION, TEXT INFORMATION, AND CAPTURED IMAGE S104

GENERATE RECORD VIEWING AND EDITING SCREEN S106

RESPOND WITH SCREEN DATA OF RECORD VIEWING AND EDITING SCREEN S108

DISPLAY RECORD VIEWING AND EDITING SCREEN S110

TOOL TIP DISPLAY PROCESSING WHEN PLAYING BACK VOICE

FIG.21

| TEXT ID | START TIME | END TIME | TEXT | BOOKMARK | VOICE DATA PATH | EDITED TEXT |
|---------|-----------|----------|------|----------|-----------------|-------------|
| 0086 | 11:31:05 | 11:31:09 | NEXT, THE OFFICE SERVICE BUSINESS. | ON | ⋮ /0005006/0086.mp3 | |
| 0087 | 11:31:10 | 11:31:11 | YES. | OFF | ⋮ /0005006/0087.mp3 | |
| 0088 | 11:31:12 | 11:31:21 | THE SECOND-HALF SALES IN 2020 OF THE OFFICE SERVICE BUSINESS IS○○○. | OFF | ⋮ /0005006/0088.mp3 | |
| 0089 | 11:31:22 | 11:31:25 | THE OPERATING PROFIT WAS △△△, BUT □□□ | OFF | ⋮ /0005006/0089.mp3 | THE OPERATING PROFIT WAS △△△, BUT □□□ |

FIG.22

| SORT RULE | DETAILS OF RULES | PRECONDITION | RESULT |
|---|---|---|---|
| IN ORDER OF NUMBER OF CHARACTERS | SORT IN DESCENDING ORDER ACCORDING TO NUMBER OF CHARACTERS IN TEXT THAT IS VOICE RECOGNITION RESULT. | | THE SECOND-HALF SALES IN 2020 OF THE OFFICE SERVICE BUSINESS IS ○○○. THE OPERATING PROFIT WAS △△△, BUT □□□. NEXT, THE PERFORMANCE OF THE OFFICE SERVICE BUSINESS |
| PRIORITIZE BOOKMARKED TEXT | FIRST, ARRANGE BOOKMARKED TEXT IN DESCENDING ORDER ACCORDING TO NUMBER OF CHARACTERS, AND SUBSEQUENTLY ARRANGE NON-BOOKMARKED TEXT IN DESCENDING ORDER ACCORDING TO NUMBER OF CHARACTERS. | "0086" IS BOOKMARKED. | NEXT, THE PERFORMANCE OF THE OFFICE SERVICE BUSINESS. THE SECOND-HALF SALES IN 2020 OF THE OFFICE SERVICE BUSINESS IS △△△. THE OPERATING PROFIT WAS △△△, BUT □□□. |
| PRIORITIZE TEXT WITH TRACK CHANGES | FIRST, ARRANGE TEXT WITH TRACK CHANGES IN DESCENDING ORDER ACCORDING TO NUMBER OF CHARACTERS, AND SUBSEQUENTLY ARRANGE TEXT WITHOUT TRACK CHANGES IN DESCENDING ORDER ACCORDING TO NUMBER OF CHARACTERS. | "0089" IS EDITED. | THE OPERATING PROFIT WAS △△△, BUT ○○○. THE SECOND-HALF SALES IN 2020 OF THE OFFICE SERVICE BUSINESS IS ○○○. NEXT, THE PERFORMANCE OF THE OFFICE SERVICE BUSINESS |
| ORDER OF CLOSENESS TO CONFERENCE MEMO | ANALYZE TEXT OF "CONFERENCE MEMO" IN RECORD BIBLIOGRAPHIC INFORMATION AND EACH TEXT IN VOICE RECOGNITION RESULT, AND ARRANGE TEXT IN ORDER OF CLOSENESS TO CONTENT OF "CONFERENCE MEMO". | THERE ARE KEYWORDS OF "PERFORMANCE" AND "BUSINESS" IN CONFERENCE MEMO. | NEXT, THE PERFORMANCE OF THE OFFICE SERVICE BUSINESS. THE SECOND-HALF SALES IN 2020 OF THE OFFICE SERVICE BUSINESS IS ○○○. THE OPERATING PROFIT WAS △△△, BUT □□□. |
| COMBINATION OF ABOVE RULES | BASED ON PRIORITY ORDER OF EACH RULE SET IN ADVANCE, ARRANGE PLURAL TEXTS BY NEXT PRIORITY ORDER RULE WHEN THERE ARE PLURAL TEXTS AT THE SAME RANK ORDER BY PARTICULAR RULE. | | |

FIG.23

RECORDING MEDIUM, INFORMATION PROCESSING APPARATUS, AND INFORMATION PROCESSING METHOD

CROSS-REFERENCE TO RELATED APPLICATION

The present application is based on and claims priority under 35 U.S.C. § 119 to Japanese Patent Application No. 2022-193781, filed on Dec. 2, 2022, the contents of which are incorporated herein by reference in their entirety.

BACKGROUND OF THE INVENTION

1. Field of the Invention

The present invention relates to a recording medium, an information processing apparatus, and an information processing method.

2. Description of the Related Art

In the related art, when voice data is played back, there has been known a technique for highlighting the playback position on a character transcribed from the voice data so that the playback position of the voice data is known (see, for example, Patent Document 1).

Patent Document 1: Japanese Unexamined Patent Application Publication No. 2022-096852

SUMMARY OF THE INVENTION

According to one aspect of the present invention, there is provided a non-transitory computer-readable recording medium storing a program that causes a computer to execute a process performed in an information processing apparatus that plays back voice data, the process including receiving, from a user, an operation of specifying a playback position of the voice data; and displaying a text of a voice to be played back from the playback position, based on the operation of specifying the playback position.

BRIEF DESCRIPTION OF THE DRAWINGS

FIG. 3 is a hardware configuration diagram of an example of a smartphone according to an embodiment of the present invention;

FIG. 5 is a configuration diagram of an example of record bibliographic information according to an embodiment of the present invention;

FIG. 6 is a configuration diagram of an example of text information according to an embodiment of the present invention;

FIG. 7 is a configuration diagram of an example of captured image information according to an embodiment of the present invention;

FIG. 8 is a sequence diagram of an example of recording processing during an online conference according to an embodiment of the present invention;

FIG. 11 is an image diagram of an example of a record in progress screen according to an embodiment of the present invention;

FIG. 12 is a sequence diagram of an example of record viewing and editing processing after an online conference according to an embodiment of the present invention;

FIG. 21 is an explanatory diagram illustrating an example of text acquired in step S200 according to an embodiment of the present invention;

FIG. 22 is an explanatory diagram illustrating an example of a predetermined rule according to an embodiment of the present invention;

FIG. 23 is a functional configuration diagram illustrating an example of an information processing system according to the present embodiment according to an embodiment of the present invention.

DESCRIPTION OF THE EMBODIMENTS

For example, when voice data is to be played back from a particular playback position, a user needs to confirm the played back voice while moving the playback position by operating a seek bar, and to identify the playback position while searching for the text corresponding to the confirmed voice from the text transcribed from the voice, thereby requiring time and effort.

A problem to be addressed by an embodiment of the present invention is to provide a program for improving convenience when a user identifies the playback position.

Embodiments of the present invention will now be described with reference to the drawings. In the present embodiment, an example of an online conference using a function of an online conference service in which a plurality of users make voice calls and share a screen, is described. However, the embodiments are not limited to an online conference, and classes, lectures, seminars (webinars) or the like conducted online may be examples.

First Embodiment

<System Configuration>

Figure 1:
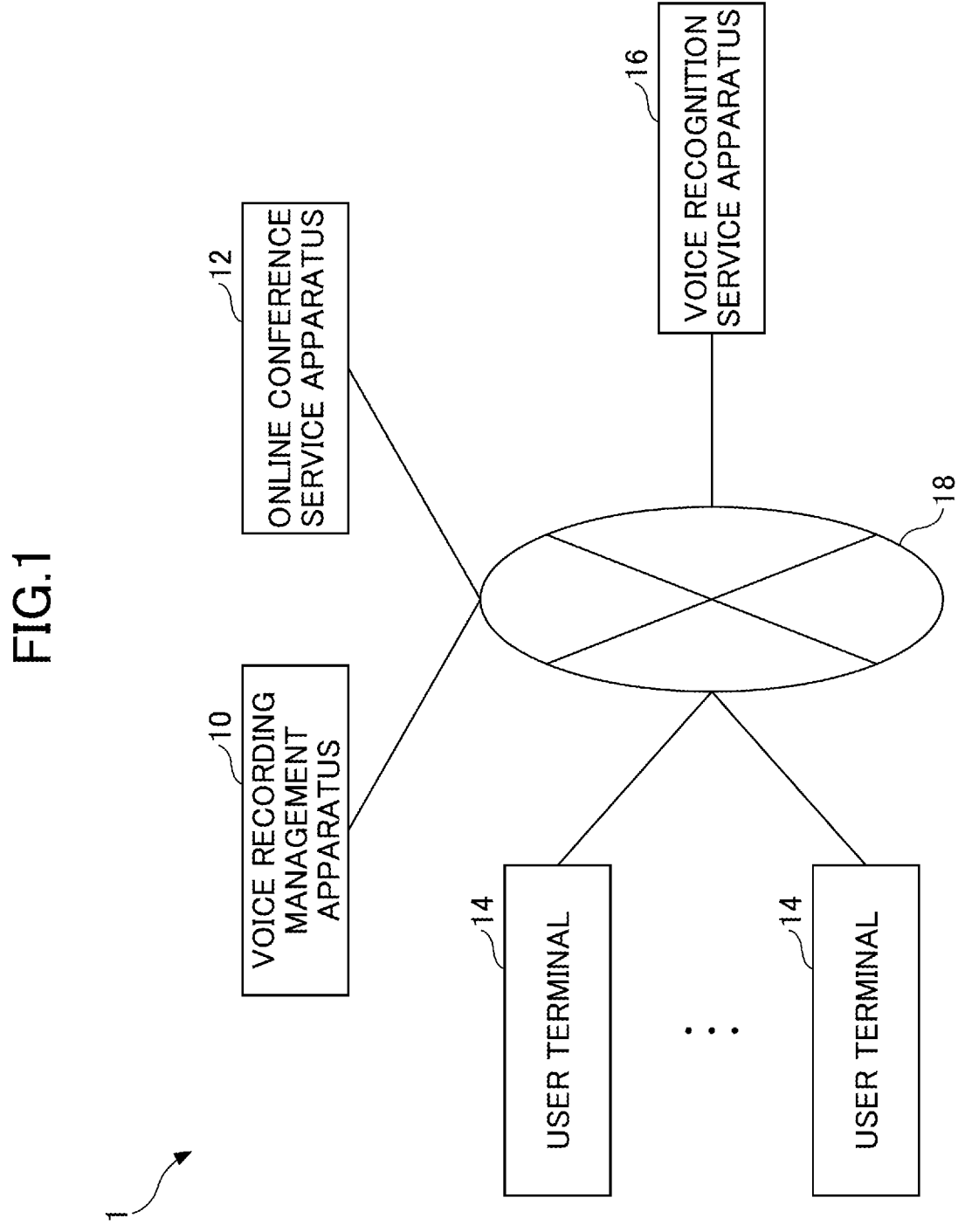
FIG. 1 is a configuration diagram of an example of an information processing system according to an embodiment of the present invention.

FIG. 1 is a configuration diagram of an example of an information processing system according to the present embodiment. In an information processing system 1 of FIG. 1, a voice recording management apparatus 10, an online conference service apparatus 12, a plurality of user terminals 14, and a voice recognition service apparatus 16 are communicatively connected via a communication network 18.

The communication network 18 is constructed by the Internet, a mobile communication network, a Local Area Network (LAN), or the like. The communication network 18 may include not only a network according to wired communication but may also a network according to wireless communication such as 3rd Generation (3G), Worldwide Interoperability for Microwave Access (WiMAX), Long Term Evolution (LTE) or the like.

The online conference service apparatus 12 provides voice calling and screen sharing functions to the user terminals 14 of users participating in online conferences. The voice recognition service apparatus 16 provides a voice recognition function for acquiring text data from voice data.

The user terminal 14 is an example of an information processing apparatus and is operated by a user participating in an online conference. The user operating the user terminal 14 is, for example, an organizer or a participant of an online conference.

The voice recording management apparatus 10 cooperates with the user terminal 14 of a user (e.g., an organizer) recording an online conference, to provide functions of recording, screen capturing, and transcription of the online conference. For example, the user terminal 14 of an organizer acquires voice data of a user participating in the online conference via a microphone and a sound card, and also acquires a captured image of a shared screen of the online conference. The voice recording management apparatus 10 uses the voice data and the captured image acquired by the user terminal 14 of the organizer, as described later, to support the preparation of minutes or the reviewing of the online conference.

The user terminal 14 may be, for example, a projector (PJ), an Interactive White Board: a white board having an electronic blackboard function capable of mutual communication (IWB), an output device such as digital signage, a Head Up Display (HUD) device, an industrial machine, an imaging element, a sound collector, a medical device, a network home appliance, an automobile (connected car), a notebook personal computer (PC), a mobile phone, a smartphone, a tablet terminal, a game machine, a Personal Digital Assistant (PDA), a digital camera, a wearable PC, a desktop PC, or the like.

The voice recording management apparatus 10, the online conference service apparatus 12, and the voice recognition service apparatus 16 are implemented by one or more information processing apparatuses. The voice recording management apparatus 10, the online conference service apparatus 12, and the voice recognition service apparatus 16 may be one or more information processing apparatuses that integrate all or part of the functions of the voice recording management apparatus 10, the online conference service apparatus 12, and the voice recognition service apparatus 16.

Each of the voice recording management apparatus 10, the online conference service apparatus 12, and the voice recognition service apparatus 16 may be configured such that the functions thereof are distributed among a plurality of information processing apparatuses to implement the functions. The voice recording management apparatus 10, the online conference service apparatus 12, and the voice recognition service apparatus 16 may be implemented by an information processing apparatus in a cloud environment or an information processing apparatus in an on-premises environment. As described above, the information processing system 1 illustrated in FIG. 1 is an example.

<Hardware Configuration>

Figure 2:
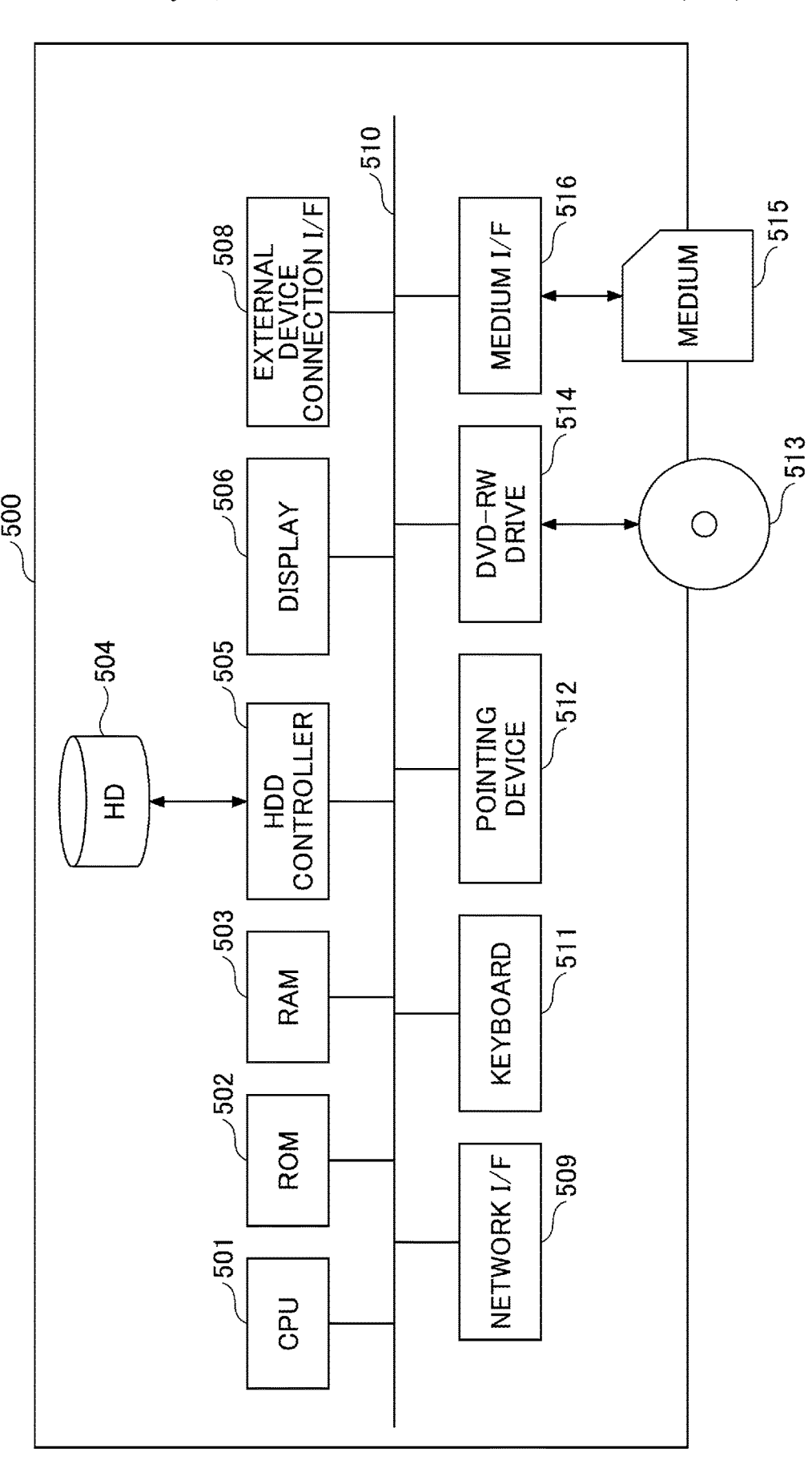
FIG. 2 is a hardware configuration diagram of an example of a computer according to an embodiment of the present invention.

The voice recording management apparatus 10, the online conference service apparatus 12, and the voice recognition service apparatus 16 illustrated in FIG. 1 are implemented, for example, by a computer 500 having the hardware configuration illustrated in FIG. 2. When the user terminal 14 is a PC, the user terminal 14 is implemented, for example, by the computer 500 having the hardware configuration illustrated in FIG. 2. FIG. 2 is a hardware configuration diagram of an example of a computer according to the present embodiment.

As illustrated in FIG. 2, the computer 500 includes a Central Processing Unit (CPU) 501, a Read Only Memory (ROM) 502, a Random Access Memory (RA) 503, a Hard Disk (HD) 504, a Hard Disk Drive (HDD) controller 505, a display 506, an external device connection Interface (I/F) 508, a network I/F 509, a data bus 510, a keyboard 511, a pointing device 512, a Digital Versatile Disk Rewritable (DVD-RW) drive 514, and a medium I/F 516.

The CPU 501 controls the operation of the entire computer 500 according to a program. The ROM 502 stores a program used for driving the CPU 501 such as an initial program loader (IPL). The RAM 503 is used as a work area of the CPU 501. The HD 504 stores various kinds of data such as programs. The HDD controller 505 controls the reading or writing of various kinds of data from or to the HD 504 under the control of the CPU 501.

The display 506 displays various kinds of information such as cursors, menus, windows, characters, images or the like. The external device connection I/F 508 is an interface for connecting various external devices. In this case, the external device is, for example, a Universal Serial Bus (USB) memory or a printer. The network I/F 509 is an interface for data communication using the communication network 18. The data bus 510 is an address bus, data bus, or the like for electrically connecting each element such as the CPU 501.

The keyboard 511 is a type of input means provided with a plurality of keys for inputting characters, numbers, various instructions, and the like. The pointing device 512 is a type of input means for selecting and executing various instructions, selecting a processing object, moving a cursor, and the like. The DVD-RW drive 514 controls the reading or writing of various kinds of data from or to the DVD-RW 513 as an example of a removable recording medium. The recording medium is not limited to a DVD-RW, but may be a Digital Versatile Disc Recordable (DVD-R) or the like. The medium I/F 516 controls the reading or writing (storage) of data from or to the recording media 515 such as the flash memory.

The programs may be files in installable or executable formats, recorded on a computer-readable recording medium, to be distributed. Examples of recording media include a Compact Disc Recordable (CD-R), a Digital Versatile Disk (DVD), a Blu-ray Disc, a secure digital (SD) (registered trademark) card, etc. The recording medium can also be provided as a program product in Japan or abroad.

Figure 3:
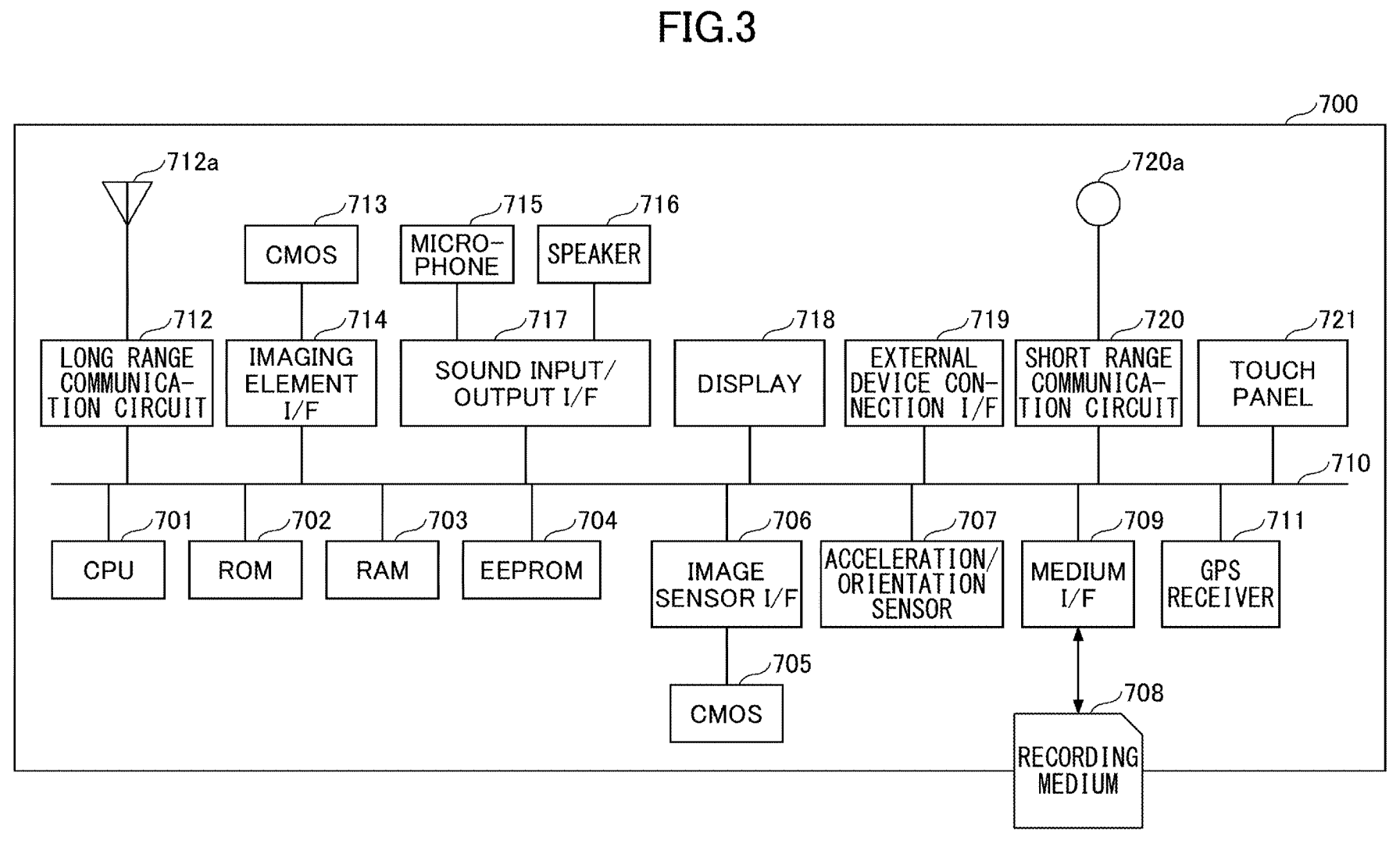

The user terminal 14 may be implemented by a smartphone 700 having the hardware configuration illustrated in FIG. 3, for example. FIG. 3 is a hardware configuration diagram of an example of a smartphone according to the present embodiment. As illustrated in FIG. 3, the smartphone 700 includes a CPU 701, a ROM 702, a RAM 703, an electrically erasable programmable read-only memory (EEPROM) 704, a Complementary Metal-Oxide-Semiconductor (CMOS) sensor 705, an image sensor I/F 706, an acceleration/orientation sensor 707, a medium I/F 709, and a global positioning system (GPS) receiver 711.

The CPU 701 controls the operation of the entire smartphone 700. The ROM 702 stores the CPU 701 and programs used to drive the CPU 701 such as the IPL. The RAM 703 is used as a work area of the CPU 701. The EEPROM 704 reads or writes various kinds of data such as a program for the smartphone 700 in accordance with the control of the CPU701.

The CMOS sensor 705 is a kind of built-in imaging means for obtaining image data by capturing a subject (mainly a self-image) under the control of the CPU 701. The imaging means may be an imaging means other than the CMOS sensor 705, such as a CCD sensor. The imaging element I/F 706 is a circuit for controlling the drive of the CMOS sensor 705. The acceleration/orientation sensor 707 is a variety of sensors such as an electronic magnetic compass, a gyrocompass, and an acceleration sensor for detecting the geomagnetic field.

The medium I/F 709 controls the reading or writing (storage) of data from or to a recording medium 708 such as a flash memory. The GPS receiver 711 receives a GPS signal from a GPS satellite.

The smartphone 700 also includes a long range communication circuit 712, a CMOS sensor 713, an imaging element I/F 714, a microphone 715, a speaker 716, a sound input/output I/F 717, a display 718, an external device connection I/F 719, a short range communication circuit 720, an antenna 720a of the short range communication circuit 720, and a touch panel 721.

The long range communication circuit 712 is a circuit for communicating with other devices via the communication network 18. The CMOS sensor 713 is a kind of built-in imaging means for obtaining image data by capturing a subject under the control of the CPU 701. The imaging element I/F 714 is a circuit for controlling the drive of the CMOS sensor 713. The microphone 715 is a built-in circuit for converting sound into an electrical signal. The speaker 716 is a built-in circuit for converting an electrical signal into a physical vibration to produce sound such as music or voices.

The sound input/output I/F 717 is a circuit for processing the input/output of sound signals between the microphone 715 and the speaker 716 under the control of the CPU 701. The display 718 is a type of display unit such as a liquid crystal or an organic Electro Luminescence (EL) that displays an image of a subject and various icons. The display may be an HMD (head-mounted display). The external device connection I/F 719 is an interface for connecting various external devices. The short range communication circuit 720 is a communication circuit such as NFC and Bluetooth. The touch panel 721 is a type of input unit in which a user presses the display 718 to operate the smartphone 700.

The smartphone 700 also includes a bus line 710. The bus line 710 is an address bus, a data bus or the like for electrically connecting each element illustrated in FIG. 3 such as the CPU 701.

<Functional Configuration>

Figure 4:
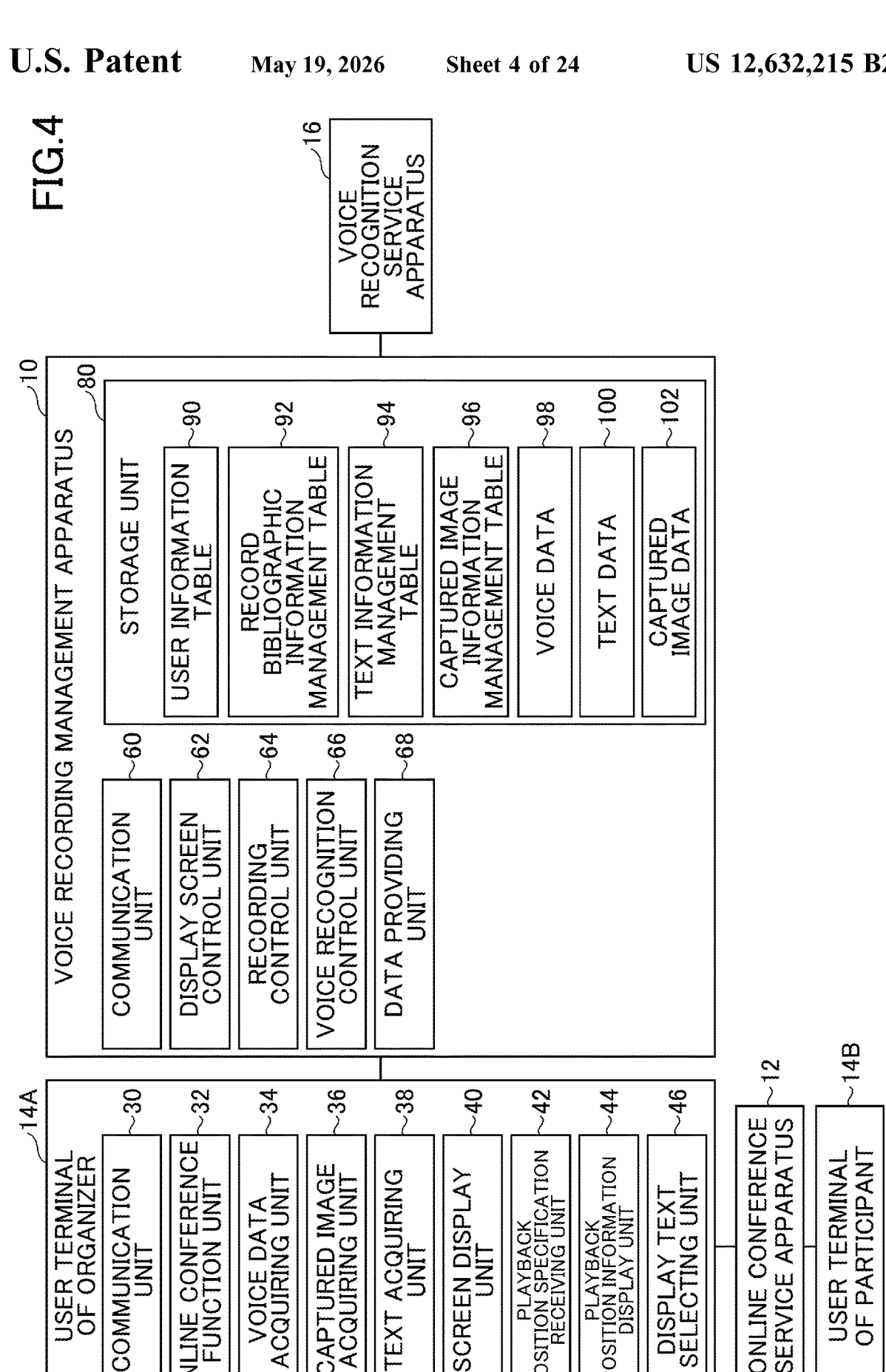
FIG. 4 is a functional configuration diagram of an example of an information processing system according to an embodiment of the present invention.

The information processing system 1 according to the present embodiment is implemented by the functional configuration illustrated in FIG. 4, for example. FIG. 4 is a functional configuration diagram of an example of the information processing system according to the present embodiment. In the functional configuration illustrated in FIG. 4, configurations unnecessary for the description of the present embodiment are omitted as appropriate. In FIG. 4, the user terminal 14 of the organizer recording the online conference is illustrated as the user terminal 14A of the organizer, and the user terminal 14 of the user participating in the online conference is illustrated as the user terminal 14B of the participant so as to distinguish between the two. The voice recording management apparatus 10 and the user terminal 14A of the organizer in FIG. 4 implement the functional configuration of FIG. 4, for example, by executing programs such as an OS and an application.

The user terminal 14A of the organizer in FIG. 4 implements the functional configuration of FIG. 4 by installing an application that performs processing in cooperation with, for example, the voice recording management apparatus 10. The user terminal 14A of the organizer in FIG. 4 may implement the functional configuration of FIG. 4 by Web services using a browser.

The user terminal 14A of the organizer includes a communication unit 30, an online conference function unit 32, a voice data acquiring unit 34, a captured image acquiring unit 36, a text acquiring unit 38, a screen display unit 40, a playback position specification receiving unit 42, a playback position information display unit 44, and a display text selecting unit 46.

The communication unit 30, the online conference function unit 32, the voice data acquiring unit 34, the captured image acquiring unit 36, the text acquiring unit 38, the screen display unit 40, the playback position specification receiving unit 42, the playback position information display unit 44, and the display text selecting unit 46 are functions implemented, for example, by operating any of the elements illustrated in FIG. 2 by an instruction from the CPU 501 in accordance with a program loaded from the HD 504 into the RAM 503.

The communication unit 30 communicates with the voice recording management apparatus 10 and the online conference service apparatus 12. The online conference function unit 32 cooperates with the online conference service apparatus 12 to provide functions of voice calling and screen sharing to the user terminal 14A of the organizer and the user terminal 14B of the participant participating in the online conference. The voice data acquiring unit 34 acquires voice data by recording speech of users participating in the online conference, and transmits the voice data to the voice recording management apparatus 10. The voice data acquiring unit 34 acquires voice data stored in the voice recording management apparatus 10.

The captured image acquiring unit 36 acquires a captured image by performing screen capturing of the screen displayed by the screen sharing function of the online conference, and transmits the captured image to the voice recording management apparatus 10. The captured image acquiring unit 36 acquires the captured image stored in the voice recording management apparatus 10.

The text acquiring unit 38 acquires, from the voice recording management apparatus 10, the text which is the voice recognition result of the voice data of the online conference. The screen display unit 40 displays on the display 506, for example, a screen such as a record start instruction screen, a record in progress screen, and a record viewing and editing screen described later.

In the record viewing and editing screen described later, the playback position specification receiving unit 42 receives an operation for specifying the playback position of the voice data from the user. The operation for specifying the playback position of the voice data is, for example, an operation by the user placing a mouse over the position of a seek bar or an operation by the user moving the knob of the seek bar.

The seek bar is a graphical user interface (GUI) that displays the playback position of the voice data and receives a specification of the playback position. For example, the seek bar moves from left to right on a bar where a "knob", which is an example of a display element indicating the playback position, is an example of a display element, thereby allowing the user to visually identify the playback position (elapsed playback time) of the voice data. The playback position specification receiving part 42 receives the specification of the playback position of the voice data by the operation of the user who moves the knob on the bar.

The playback position specification receiving part 42 receives the specification of the playback position of the voice data by the operation of the user who moves the mouse over the bar of the seek bar. Mouseover is an operation in which a pointer or a cursor is placed over a target display element (display component).

The playback position information display unit 44 displays the text of the voice played back from the playback position based on an operation to specify the playback position of the voice data. For example, the playback position information display unit 44 displays the text of the voice played back from the playback position on a tool tip described later. The tool tip is an example of a display element of a screen, and is a display area that appears by a mouse over operation in which the pointer or cursor is placed over the target display element.

The display text selecting unit 46 selects the text of the voice to be displayed based on the operation of specifying the playback position of the voice data according to the rule described below. The display text selecting unit 46 selects the text to be displayed on the tool tip by the playback position information display unit 44, for example, according to the rule described below.

The voice recording management apparatus 10 includes a communication unit 60, a display screen control unit 62, a recording control unit 64, a voice recognition control unit 66, a data providing unit 68, and a storage unit 80. The communication unit 60, the display screen control unit 62, the recording control unit 64, the voice recognition control unit 66, and the data providing unit 68 are functions implemented, for example, by operating any of the elements illustrated in FIG. 2 by an instruction from the CPU 501 in accordance with a program loaded from the HD 504 into the RAM 503. The storage unit 80 is a function implemented by the HD504 and the like illustrated in FIG. 2.

The communication unit 60 communicates with the user terminal 14A of the organizer and the voice recognition service apparatus 16. The display screen control unit 62 controls the screen displayed by the user terminal 14A of the organizer. The recording control unit 64 controls the recording of a user information table 90, a record bibliographic information management table 92, a text information management table 94, a captured image information management table 96, voice data 98, text data 100, and captured image data 102 in the storage unit 80.

The voice recognition control unit 66 requests the voice recognition of the voice data of the online conference to the voice recognition service apparatus 16, and acquires the text of the voice of the voice recognition result obtained by the voice recognition service apparatus 16. The data providing unit 68 provides the user terminal 14A of the organizer with, for example, record bibliographic information, text information, captured image information, voice data, text data, and captured image data stored in the storage unit 80.

The record bibliographic information management table 92 of the storage unit 80 stores, for example, the record bibliographic information illustrated in FIG. 5. FIG. 5 is a configuration diagram of an example of record bibliographic information. The record bibliographic information illustrated in FIG. 5 is created for each record ID associated with, for example, an online conference. The record bibliographic information includes the items of record name, participant, conference memo, start date and time, end date and time, voice data path, user ID, and conference URL.

The record ID is an example of identification information of the record bibliographic information associated with, for example, an online conference. The record name is, for example, a name of an online conference. The participant is, for example, a participant of an online conference. The conference memo is, for example, a memo about an online conference. The start date and time and the end date and time are the start date and time and the end date and time of an online conference. The voice data path is the voice data path for an online conference. The user ID is an example of the identification information of an organizer that records an online conference. The conference URL is the URL where the online conference is held.

The text information management table 94 of the storage unit 80 stores, for example, the text information illustrated in FIG. 6. FIG. 6 is a configuration diagram of an example of text information. The text information illustrated in FIG. 6 is created for each record ID associated with, for example, an online conference. The text information includes items of a text ID, a start time, an end time, a text, a bookmark, a voice data path, and an edited text.

The text ID is an example of identification information of a text of a voice which is a voice recognition result of voice data of an online conference. The start time and the end time are the start time and the end time of the speech corresponding to the text. The text is text obtained by performing voice recognition on the voice data of an online conference, and represents the content of the speech of the participant in the online conference. The bookmark is an example of information indicating that the bookmark described later is ON or OFF. The voice data path is a path of voice data of the text identified by a text ID. The edited text is the text edited by an organizer or the like who records an online conference.

The captured image information management table 96 of the storage unit 80 stores, for example, the captured image information illustrated in FIG. 7. FIG. 7 is a configuration diagram of an example of captured image information. The captured image information illustrated in FIG. 7 is created for each record ID associated with, for example, an online conference. The captured image information includes items of an image ID, an acquisition time, and an image path.

The image ID is an example of identification information of a captured image of a shared screen of an online conference. The acquisition time is the time when the screen of the shared screen was captured. The image path is the path of the captured image identified by the image ID. The captured image information illustrated in FIG. 7 illustrates an example of screen capture performed once every 30 seconds.

<Processing>

Hereinafter, processing of each embodiment will be described. The information processing system 1 according to the present embodiment performs the recording processing described below during the online conference, and performs the record viewing and editing processing described below after the online conference.

<<Recording Processing>>

Figure 8:
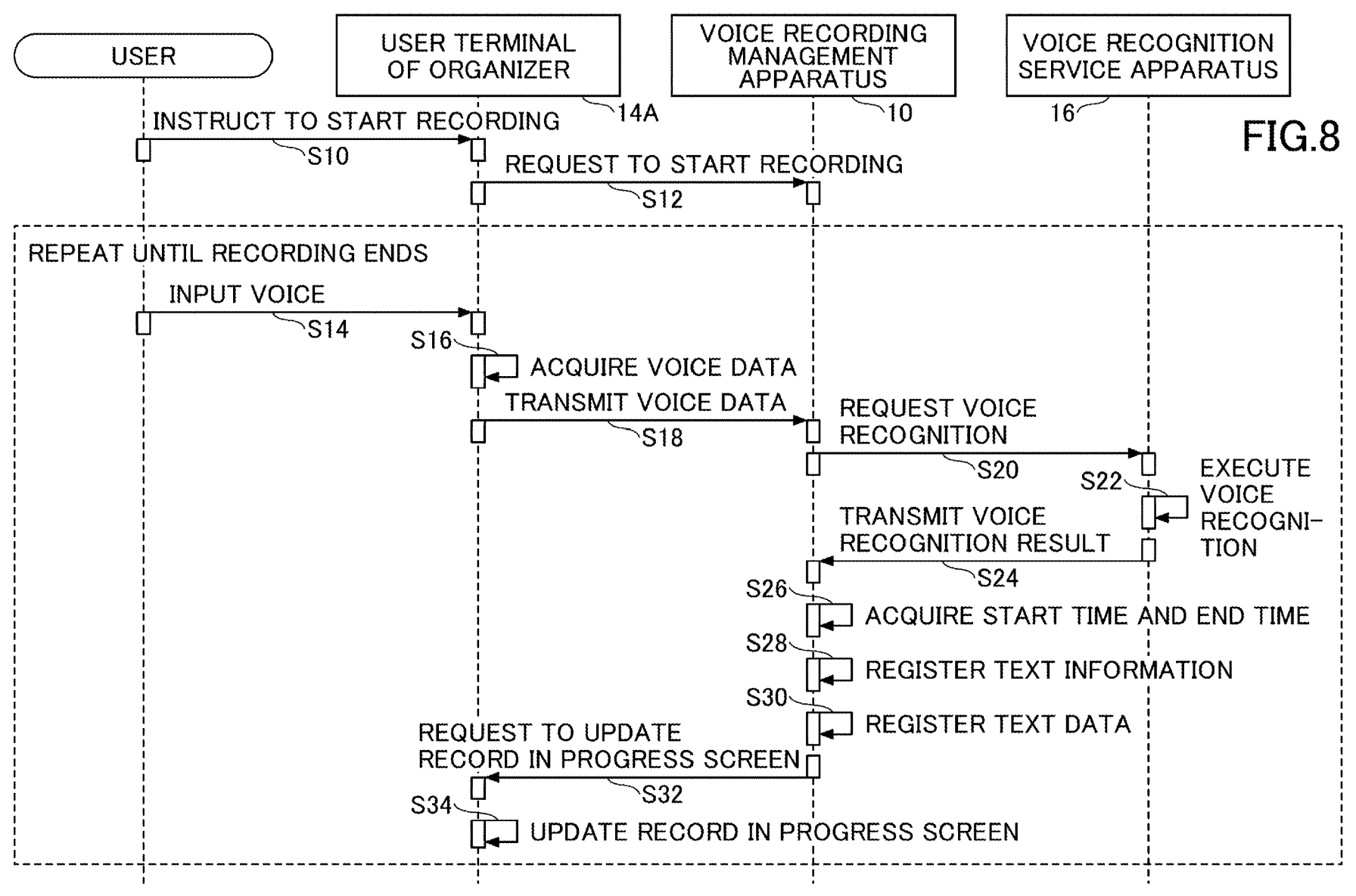
Figure 9:
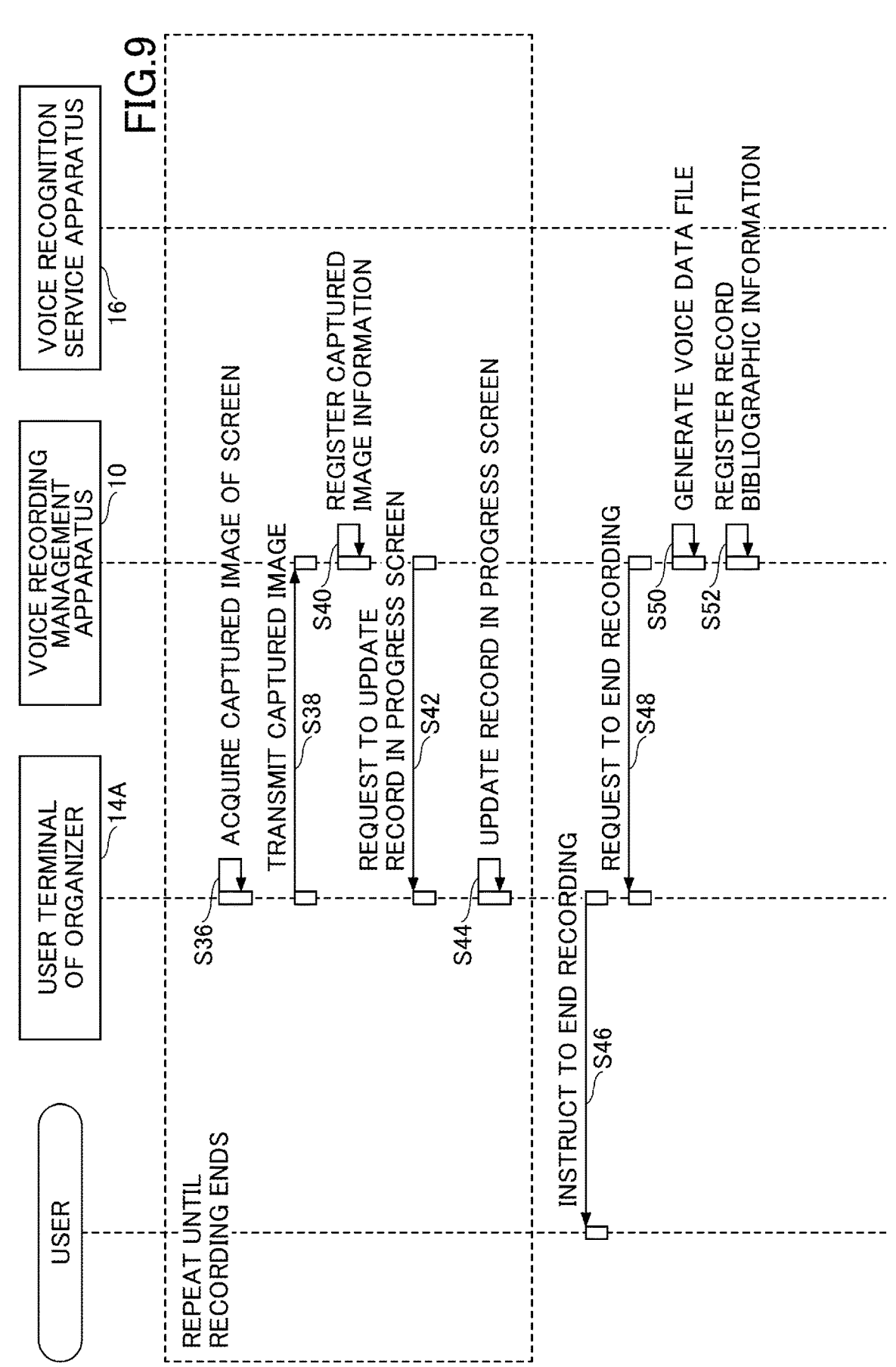
FIG. 9 is a sequence diagram of an example of recording processing during an online conference according to an embodiment of the present invention.

The information processing system 1 according to the present embodiment performs, for example, the recording processing illustrated in FIGS. 8 and 9 during an online conference. FIGS. 8 and 9 are sequence diagrams of an example of the recording processing during an online conference according to the present embodiment.

Figure 10:
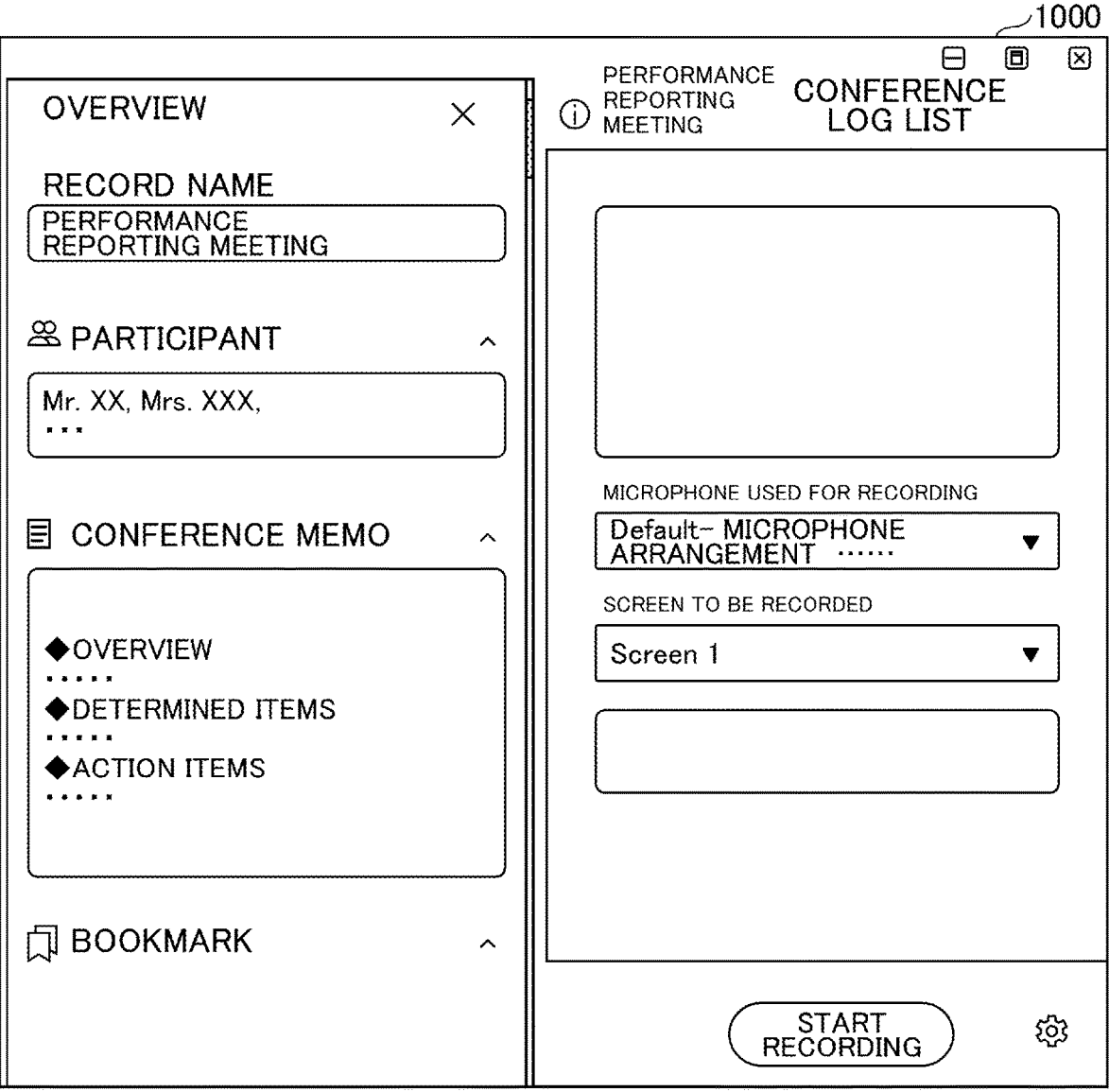
FIG. 10 is an image diagram of an example of a record start instruction screen according to an embodiment of the present invention.

A user, who operates the user terminal 14A of the organizer and records an online conference, accesses the voice recording management apparatus 10, inputs a user ID and a password in a login screen, and requests to log in. When the login is successful, the user terminal 14A of the organizer displays, for example, a record start instruction screen 1000 illustrated in FIG. 10. FIG. 10 is an image diagram of an example of a record start instruction screen.

The record start instruction screen 1000 of FIG. 10 receives, from a user who records an online conference, input such as a record name, a participant, and a conference memo of the online conference. The record start instruction screen 1000 receives, from a user who records an online conference, a recording start instruction by clicking a recording start button or the like.

In step S10, the user who records the online conference instructs to start recording from the record start instruction screen 1000. In step S12, the user terminal 14A of the organizer transmits information such as the record name, the participant, and the conference memo of the online conference input in the record start instruction screen 1000, and requests the voice recording management apparatus 10 to start recording. After requesting the voice recording management apparatus 10 to start recording, the user terminal 14A of the organizer displays, for example, a record in progress screen 1100 illustrated in FIG. 11. FIG. 11 is an image diagram of an example of the record in progress screen.

The record in progress screen 1100 of FIG. 11 receives, from a user who records an online conference, an instruction to pause recording or end recording by clicking a pause button or a recording end button. The record in progress screen 1100 of FIG. 11 includes a text display field 1102 in which the text of the voice of the voice recognition result is displayed.

After the request to start recording in step S12, the processing of steps S14 to S34 is repeated in the information processing system 1 according to the present embodiment until an instruction to end recording is received from the user who records the online conference.

In step S14, the users of the user terminal 14A of the organizer and the user terminal 14B of the participant speak and perform voice input. The voice input is not limited to the speech of the user participating in the online conference, and may be a voice guidance, a machine voice, or the like.

In step S16, the voice data acquiring unit 34 of the user terminal 14A of the organizer acquires voice data by voice input. In step S18, the voice data acquiring unit 34 transmits the acquired voice data to the voice recording management apparatus 10 by, for example, voice streaming. The recording control unit 64 of the voice recording management apparatus 10 stores the voice data 98 in the storage unit 80.

In step S20, the voice recognition control unit 66 of the voice recording management apparatus 10 requests the voice recognition service apparatus 16 to recognize the voice data received in step S18. For example, the voice recognition control unit 66 may intermittently transmit, to the voice recognition service apparatus 16, the voice streaming received from the user terminal 14A of the organizer, even if the user's speech is not included.

The voice recognition control unit 66 may individually transmit voice data to the voice recognition service apparatus 16 based on the specification of the Application Programming Interface (API) of the voice recognition service apparatus 16 to request voice recognition.

In step S22, the voice recognition service apparatus 16 executes voice recognition for the received voice data. For example, the voice recognition service apparatus 16 determines the speech period and acquires text data of the voice recognition result and information on the start and end times of the speech period. In step S24, the voice recognition service apparatus 16 transmits, to the voice recording management apparatus 10, text data of the voice recognition result and information on the start and end times of the speech period.

In step S26, the voice recognition control unit 66 of the voice recording management apparatus 10 acquires the start and end times from the start and end times of the received speech period. The start and end times of the speech period are the time elapsed from the beginning of the first voice data. The voice recognition control unit 66 converts the start and end times of the speech period into the start and end times of the speech period based on the start date and time of the record bibliographic information illustrated in FIG. 5.

In step S28, the recording control unit 64 of the voice recording management apparatus 10 registers text information in the text information management table 94 based on the voice recognition result received in step S24. In step S30, the recording control unit 64 of the voice recording management apparatus 10 registers text data 100 in the storage unit 80 based on the voice recognition result received in step S24.

In step S32, the display screen control unit 62 of the voice recording management apparatus 10 transmits the text data of the voice recognition result received in step S24 and the start time of the speech period acquired in step S26 to the user terminal 14A of the organizer, and requests the update of the record in progress screen 1100.

In step S34, the screen display unit 40 of the user terminal 14A of the organizer updates the text display field 1102 of the record in progress screen 1100 illustrated in FIG. 11 based on the text data of the voice recognition result received in step S32 and the start time of the speech period. The screen display unit 40 performs an update processing of adding the text data of the voice recognition result received in step S32 and the start time of the speech period, to the text display field 1102 of the record in progress screen 1100.

Further, in the information processing system 1 according to the present embodiment, the processing of steps S36 to S44 is repeated in parallel with the processing of steps S14 to S34 until an instruction to end the recording is received from the user who records the online conference.

In step S36, the captured image acquiring unit 36 of the user terminal 14A of the organizer acquires the captured image by performing screen capture of the screen displayed by the function of screen sharing of the online conference. In step S38, the captured image acquiring unit 36 transmits the acquired captured image to the voice recording management apparatus 10. The recording control unit 64 of the voice recording management apparatus 10 stores the captured image data 102 in the storage unit 80.

In step S40, the recording control unit 64 of the voice recording management apparatus 10 registers the captured image information in the captured image information management table 96 based on the captured image received in step S38. The acquisition time of the captured image information is the time when screen capture of the shared screen was performed in step S36.

In step S42, the display screen control unit 62 of the voice recording management apparatus 10 transmits the captured image received in step S38 to the user terminal 14A of the organizer, and requests the update of the record in progress screen 1100. In step S44, the screen display unit 40 of the user terminal 14A of the organizer updates the record in progress screen 1100 of FIG. 11 based on the captured image received in step S42. The processing in steps S36 to S44 is executed every predetermined period (e.g., 30 seconds).

In step S46, the user who records the online conference instructs to end recording from the record in progress screen 1100. In step S48, the user terminal 14A of the organizer requests the voice recording management apparatus 10 to end the recording.

In step S50, the recording control unit 64 of the voice recording management apparatus 10 generates one voice data file by merging the voice data corresponding to the voice data path of the text information illustrated in FIG. 6. In step S52, the recording control unit 64 registers the path of the voice data file generated in step S50 with the voice data path of the record bibliography information illustrated in FIG. 5.

<<Record Viewing and Editing Processing>>

The information processing system 1 according to the present embodiment performs the record viewing and editing processing illustrated in FIG. 12, for example, after the online conference. FIG. 12 is a sequence diagram of an example of the record viewing and editing processing after the online conference according to the present embodiment.

A user, who operates the user terminal 14A of the organizer and performs record viewing and editing processing of an online conference, accesses the voice recording management apparatus 10, inputs a user ID and a password in a login screen, and requests to log in. When the login is successful, the user terminal 14A of the organizer displays, for example, a record list screen, and causes a user to select a record of an online conference by the user. The user can also select a record of an online conference by inputting the URL of the shared record into the address field of the browser. The user who performs the record viewing and editing processing of the online conference may be the same or different from the user who recorded the online conference.

In step S100, the user selects the record of the online conference. In step S102, the screen display unit 40 of the user terminal 14A of the organizer specifies the record ID of the online conference selected by the user in step S100, and makes a request to the voice recording management apparatus 10 for a record viewing and editing screen.

In step S104, the display screen control unit 62 of the voice recording management apparatus 10 acquires, from the storage unit 80, the record bibliography information illustrated in FIG. 5, the text information illustrated in FIG. 6, and the captured image information illustrated in FIG. 7 corresponding to the specified record ID.

Figure 13:
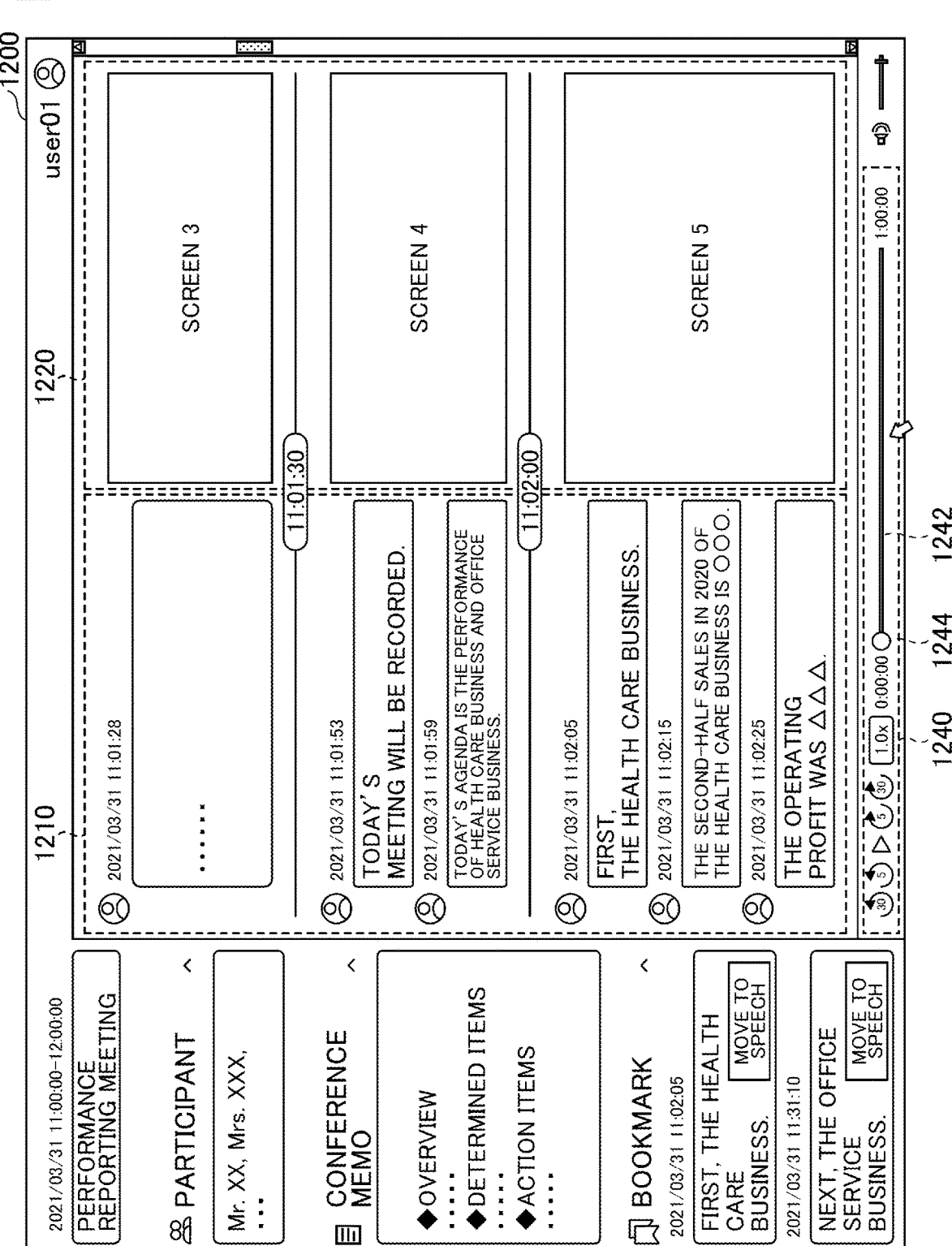
FIG. 13 is an image diagram of an example of a record viewing and editing screen according to an embodiment of the present invention.

In step S106, the display screen control unit 62 generates, for example, screen data of a record viewing and editing screen 1200 of FIG. 13 by using the record bibliographic information, text information, and captured image information acquired in step S104.

FIG. 13 is an image diagram of an example of the record viewing and editing screen. The record viewing and editing screen 1200 of FIG. 13 includes a text display field 1210 for displaying text that is the voice recognition result of the voice data of the online conference, a captured image display field 1220 for displaying captured images for each predetermined period (e.g., 30 seconds) in which the screen is captured during the online conference, and a seek bar display field 1240. The seek bar display field 1240 displays a seek bar including a bar 1242 and a "knob" 1244 that moves on the bar 1242.

In step S108, the display screen control unit 62 of the voice recording management apparatus 10 responds to the user terminal 14A of the organizer with the screen data of the record viewing and editing screen 1200 generated in step S106. In step S110, the screen display unit 40 of the user terminal 14A of the organizer displays the record viewing and editing screen 1200.

The user can specify the playback position of the voice data of the online conference by operating the seek bar of the record viewing and editing screen 1200 of FIG. 13 displayed on the user terminal 14A of the organizer. When the user terminal 14A of the organizer receives a specification of the playback position of the voice data from the user, the user terminal 14A of the organizer performs the following tool tip display processing for the voice playback.

Figure 14:
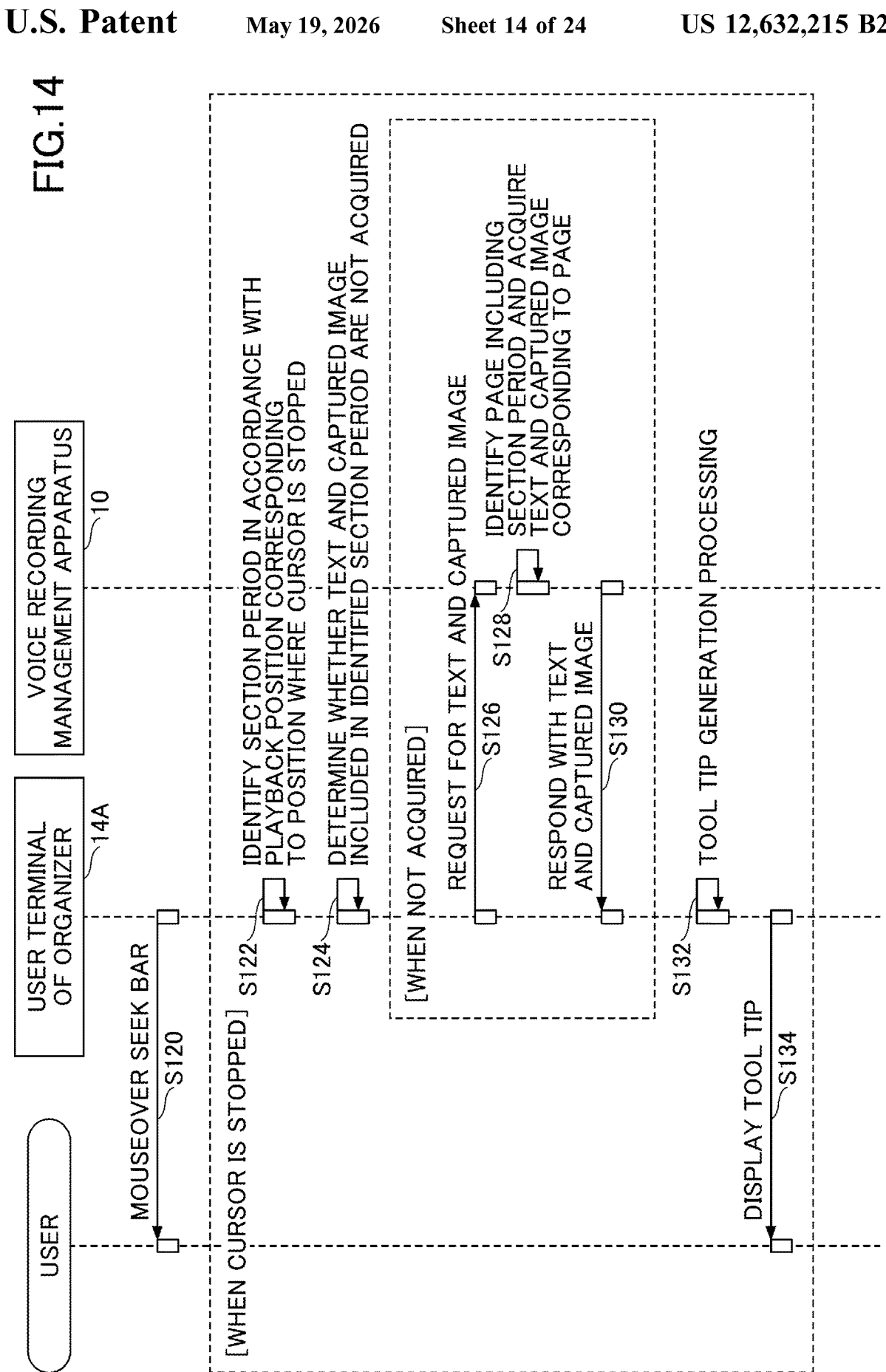
FIG. 14 is a sequence diagram illustrating an example of tool tip display processing during voice playback according to an embodiment of the present invention.

FIG. 14 is a sequence diagram of an example of the tool tip display processing for the voice playback. FIG. 14 is an example of receiving the specification of the playback position of the voice data by mouse over. In step S120, the user performs an operation of placing a mouse over the bar 1242 of the seek bar of the seek bar display field 1240. The playback position specification receiving unit 42 of the user terminal 14A of the organizer receives an operation of specifying the playback position of the voice data from the user.

When the cursor or pointer (hereinafter simply referred to as a cursor) is stopped on the bar 1242, the playback position information display unit 44 of the user terminal 14A of the organizer performs the processing of step S122. In step S122, the playback position information display unit 44 identifies a section period corresponding to the playback position corresponding to the position where the cursor is stopped.

For example, when the playback position corresponding to the position where the cursor is stopped is "11:31:23", the playback position information display unit 44 identifies a period of 30 seconds from "11:31:00" to "11:31:30" as a section period. The period of 30 seconds as the time interval of the section period is an example.

In step S124, the playback position information display unit 44 determines whether the text and the captured image, included in the section period identified in step S122, have not been acquired.

For example, when the identified section period is "11:31:00" to "11:31:30", the playback position information display unit 44 refers to the text information in FIG. 6 and determines whether the text of the text IDs "0086" to "0089", having a start time included in the identified section period, have not been acquired. The playback position information display unit 44 refers to the captured image information in FIG. 7 and determines whether a captured image that is acquired at the time of the start time of the identified section period, has not been acquired.

When the text and the captured image included in the identified section period have not been acquired, the playback position information display unit 44 performs the processing in step S126. The processing in steps S126 to S130 is executed when the text and the captured image included in the identified section period are not acquired. In step S126, the playback position information display unit 44 specifies the identified section period section and makes a request to the voice recording management apparatus 10 for the text and the captured image.

In step S128, the data providing unit 68 of the voice recording management apparatus 10 identifies the page including the specified section period and acquires the text and the captured image corresponding to the identified page from the storage unit 80. The section period included in the page is identified by the number of texts for each page displayed in the text display field 1210 of the record viewing and editing screen 1200. In step S130, the data providing unit 68 responds to the user terminal 14A of the organizer with the text and the captured image corresponding to the identified page.

In step S132, the display text selecting unit 46 of the user terminal 14A of the organizer selects the text to be displayed on the tool tip by the playback position information display unit 44, according to the rules described below. In step S134, the playback position information display unit 44 performs the tool tip generation processing described below. In step S134, the playback position information display unit 44 displays the tool tip 1230 on the record viewing and editing screen 1200 as illustrated in FIG. 15, for example.

Figure 15:
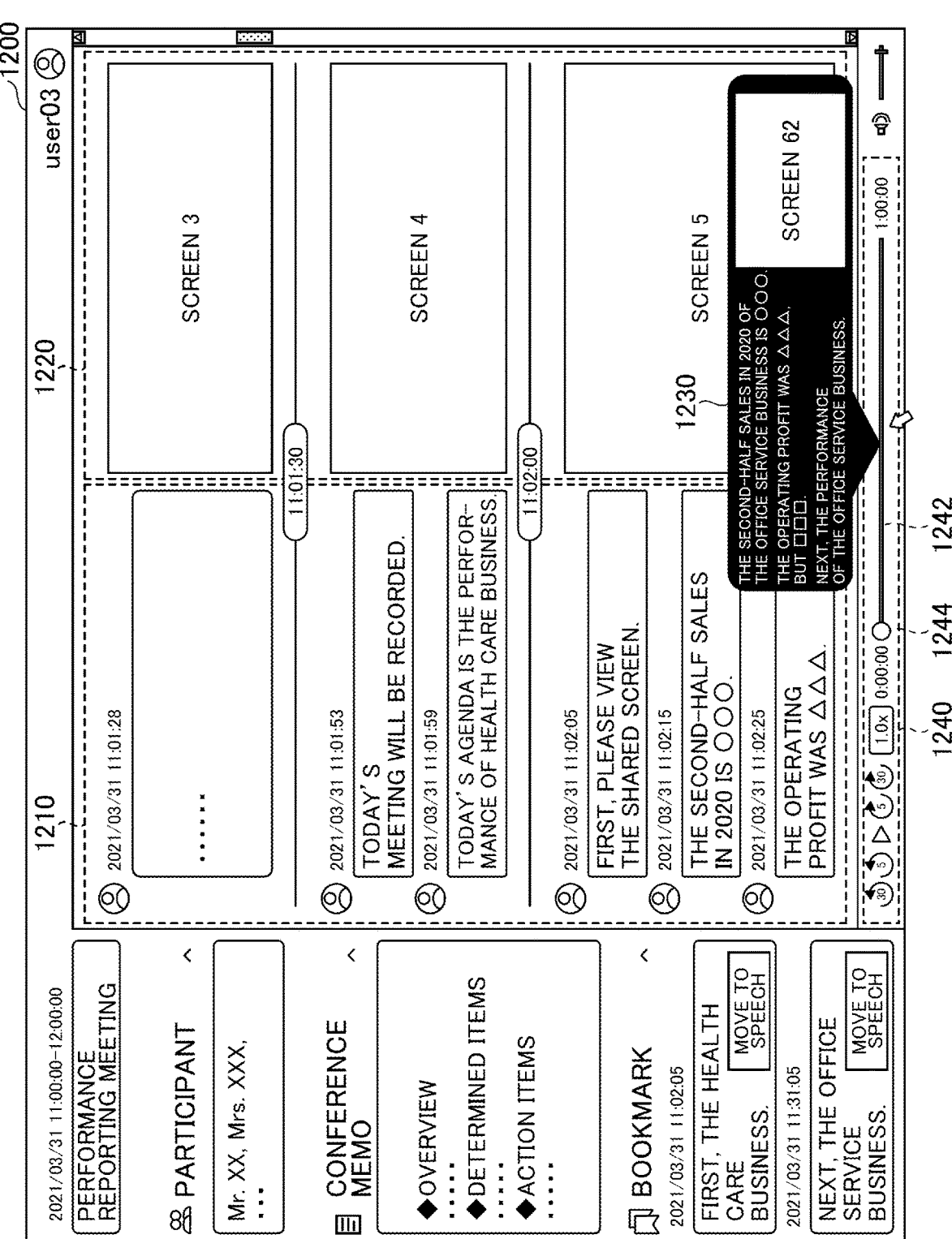
FIG. 15 is an image diagram illustrating an example of a record viewing and editing screen in which a tool tip is displayed according to an embodiment of the present invention.

FIG. 15 is an image diagram of an example of a record viewing and editing screen in which a tool tip is displayed. In the tool tip 1230 of FIG. 15, among the texts included in the section period specified by the user by mouse over in step S120, the text selected according to the rule described below is displayed. In the tool tip 1230 of FIG. 15, the captured image obtained by capturing the screen is displayed in the section period specified by the user by a mouse over operation in step S120. Note that the tool tip 1230 illustrated in FIG. 15 is an example, for example, the captured image may be omitted. The processing in steps S122 to S130 may be performed by the voice recording management apparatus 10.

Figure 16:
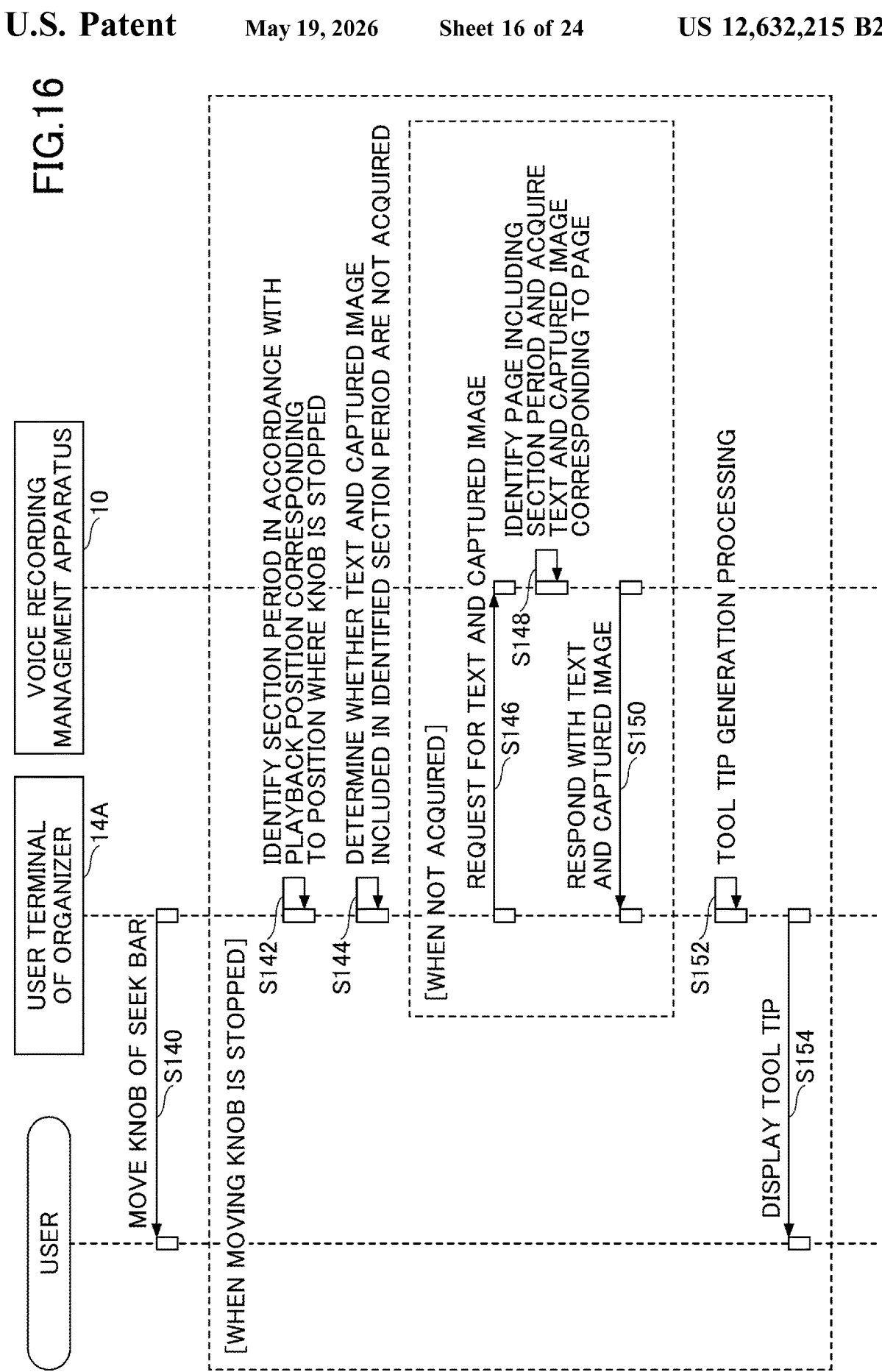
FIG. 16 is a sequence diagram illustrating an example of tool tip display processing at the time of voice playback according to an embodiment of the present invention.
Figure 17:
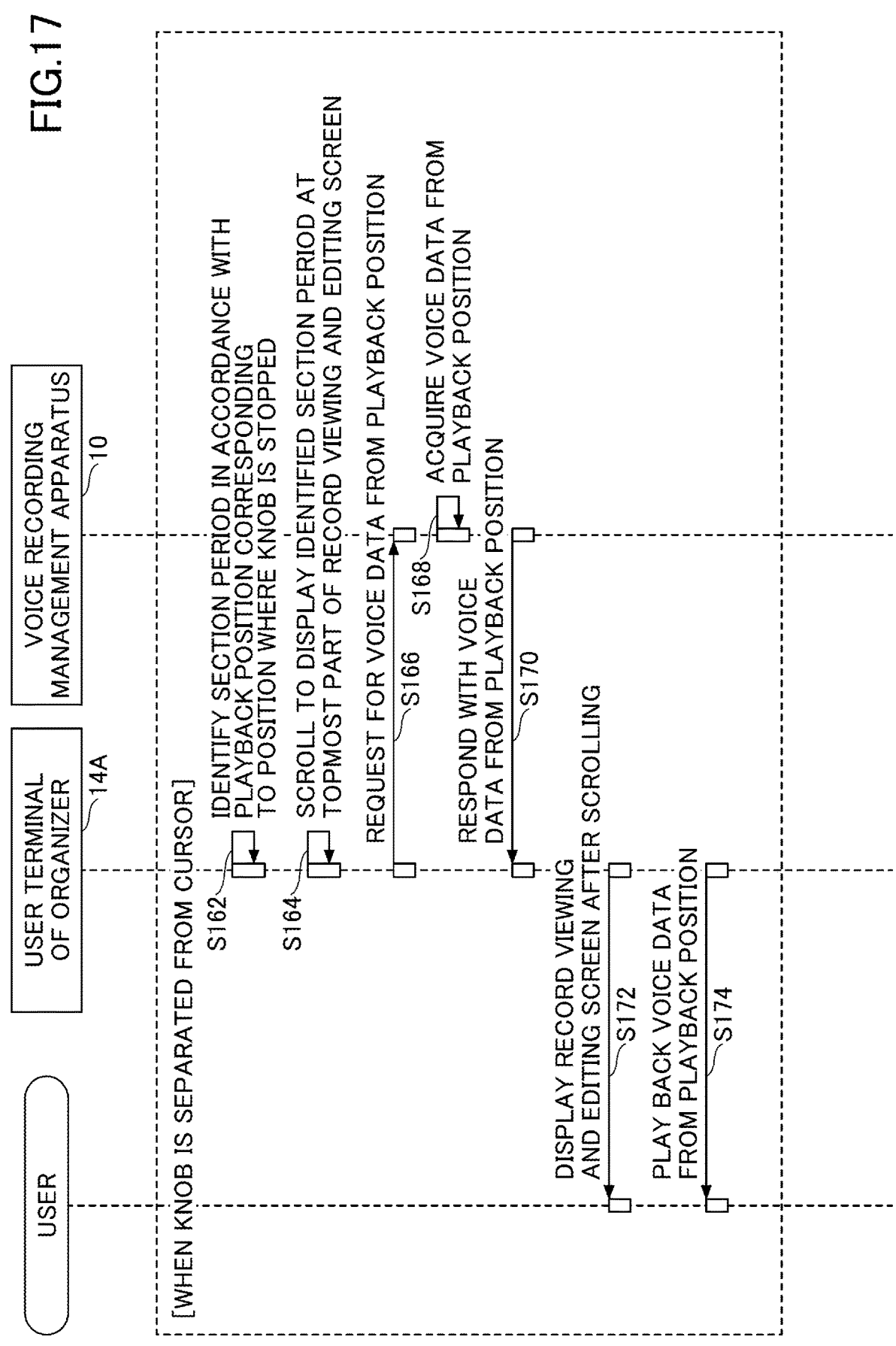
FIG. 17 is a sequence diagram illustrating an example of tool tip display processing at the time of voice playback according to an embodiment of the present invention.

FIGS. 16 and 17 are sequence diagrams of an example of the tool tip display processing for voice playback. FIGS. 16 and 17 are examples of receiving the specification of the playback position of voice data by moving the "knob" 1244 of the seek bar.

In step S140, the user performs an operation to move the "knob" 1244 on the bar 1242 of the seek bar of the seek bar display field 1240. The playback position specification receiving unit 42 of the user terminal 14A of the organizer receives an operation to move the "knob" 1244 on the bar 1242 of the seek bar from the user.

After the user stops moving the "knob" 1244, when a predetermined period of time has passed without separating the cursor from the "knob" 1244, the playback position information display unit 44 of the user terminal 14A of the organizer performs the processing in step S142. In step S142, the playback position information display unit 44 identifies a section period corresponding to the playback position corresponding to the position where the "knob" 1244 is stopped.

In step S144, the playback position information display unit 44 determines whether the text and the captured image included in the section period identified in step S142 have not been acquired. When the text and the captured image included in the identified section period have not been acquired, the playback position information display unit 44 performs the processing in step S146. The processing in steps S146 to S150 is executed when the text and the captured image included in the identified section period have not been acquired. In step S146, the playback position information display unit 44 specifies the identified section period and makes a request to the voice recording management apparatus 10 for the text and the captured image.

In step S148, the data providing unit 68 of the voice recording management apparatus 10 identifies the page including the specified section period, and acquires the text and the captured image corresponding to the identified page from the storage unit 80. In step S150, the data providing unit 68 responds to the user terminal 14A of the organizer with the acquired text and the captured image.

In step S152, the display text selecting unit 46 of the user terminal 14A of the organizer selects the text to be displayed on the tool tip by the playback position information display unit 44 according to the rules described below. In step S154, the playback position information display unit 44 performs the tool tip generation processing described below. In step S154, the playback position information display unit 44 displays the tool tip 1230 on the record viewing and editing screen 1200 as illustrated in FIG. 18, for example.

Figure 18:
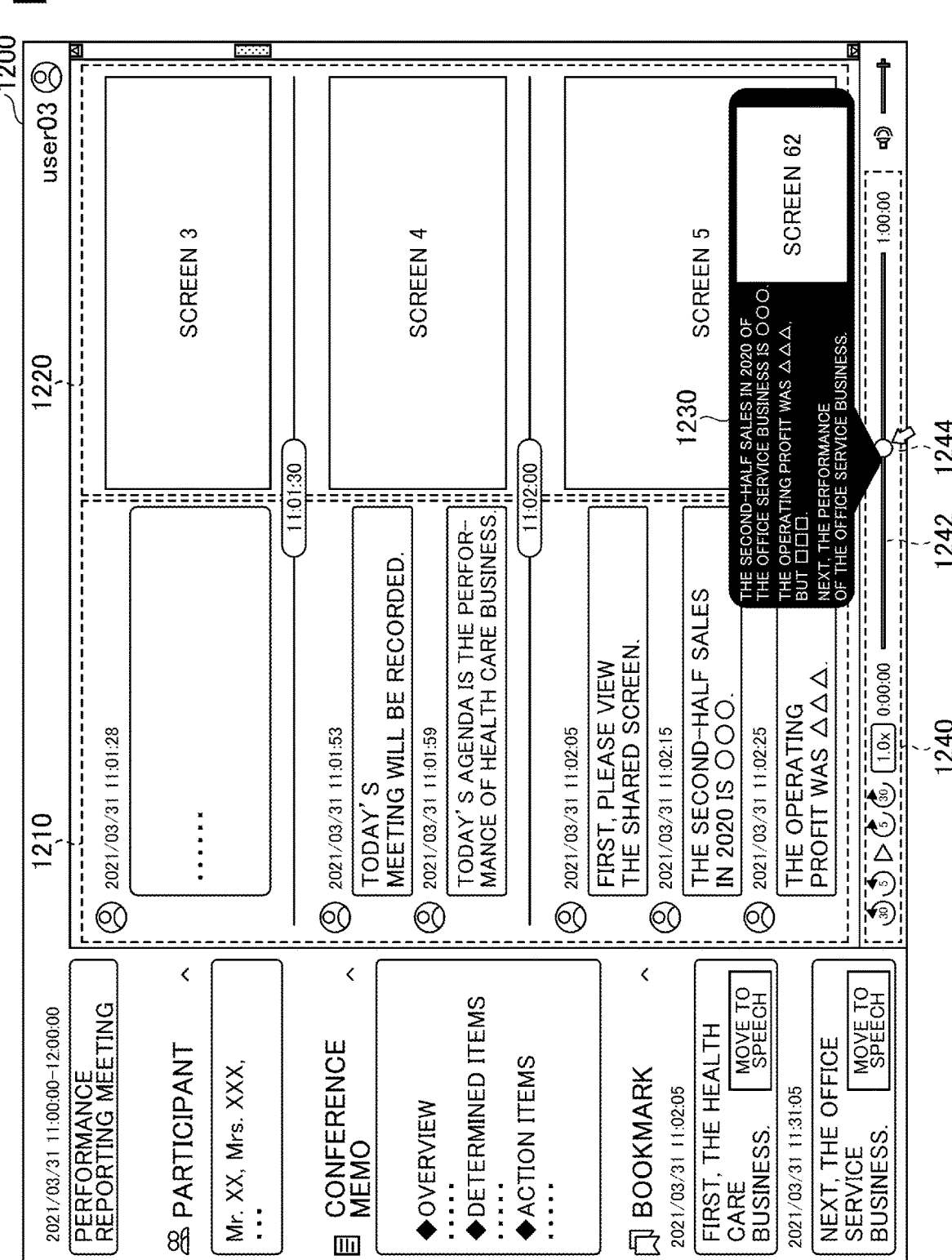
FIG. 18 is an image diagram illustrating an example of a record viewing and editing screen in which a tool tip is displayed according to an embodiment of the present invention.

FIG. 18 is an image diagram of an example of the record viewing and editing screen in which the tool tip is displayed. The tool tip 1230 of FIG. 18 displays the text selected according to the rule described below from among the text included in the section period specified by the user by moving the "knob" 1244 in step S140. In the tool tip 1230 of FIG. 18, the captured image obtained by capturing the screen is displayed in the section period specified by the user by moving the "knob" 1244 in step S140. The tool tip 1230 of FIG. 18 is an example, and the captured image may be omitted. The processing of steps S142 to S150 may be performed by the voice recording management apparatus 10.

When the cursor is separated from the "knob" 1244 after the user stops moving the "knob" 1244, the playback position information display unit 44 of the user terminal 14A of the organizer performs the processing of step S162.

In step S162, the playback position information display unit 44 identifies a section period corresponding to the playback position corresponding to the position where the "knob" 1244 is stopped. In step S164, the screen display unit 40 scrolls the section period identified in step S162 so that the section period is displayed at the top of the record viewing and editing screen 1200.

In step S166, the playback position information display unit 44 of the user terminal 14A of the organizer makes a request to the voice recording management apparatus 10 for the voice data from the playback position. In step S168, the data providing unit 68 of the voice recording management apparatus 10 refers to the text information in the storage unit 80 and acquires the voice data from the playback position from the storage unit 80. In step S170, the data providing unit 68 responds to the user terminal 14A of the organizer with the acquired voice data from the playback position.

Figure 19:
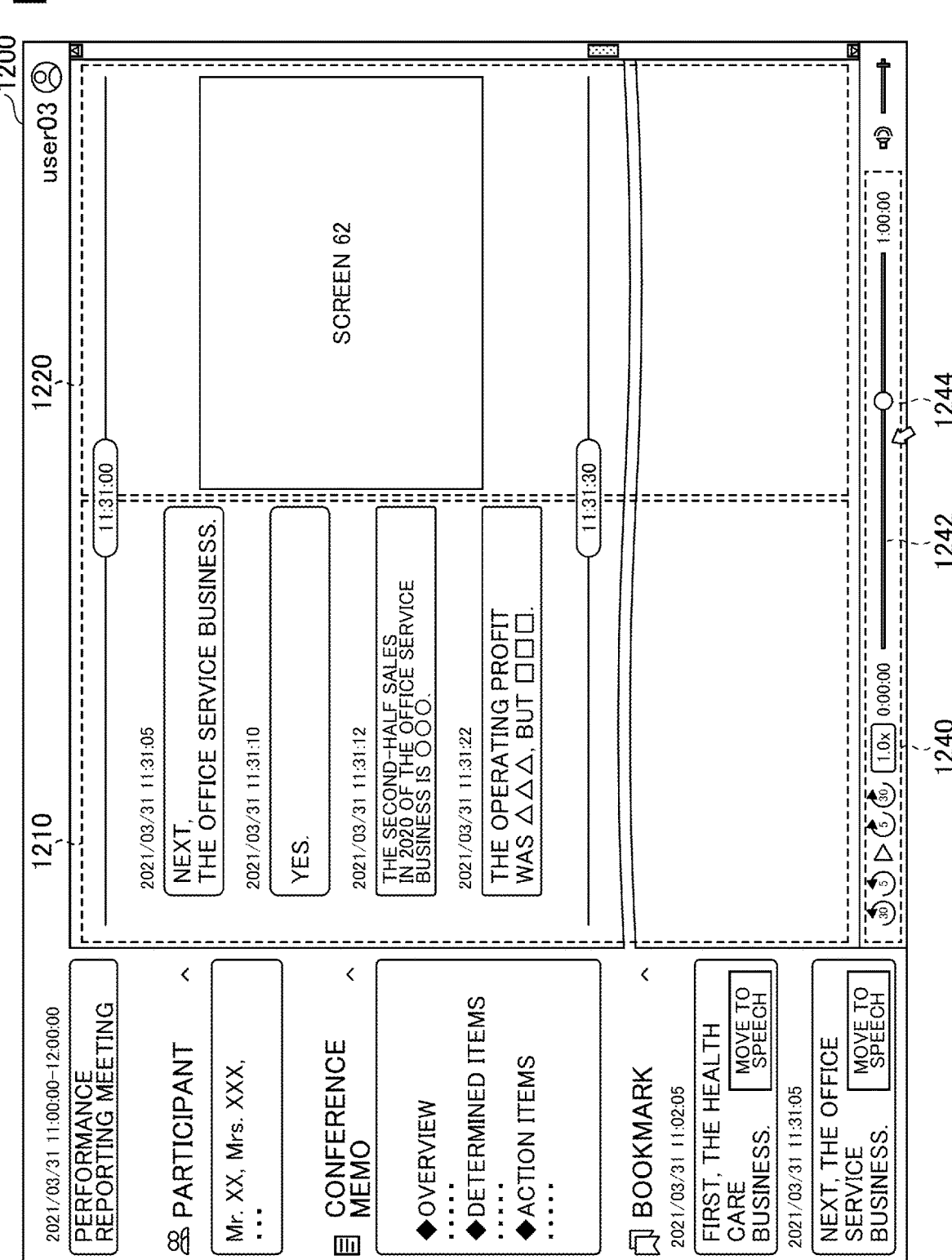
FIG. 19 is an image diagram illustrating an example of a record viewing and editing screen after scrolling according to an embodiment of the present invention.

In step S172, the screen display unit 40 of the user terminal 14A of the organizer displays, for example, the record viewing and editing screen 1200 after scrolling illustrated in FIG. 19. FIG. 19 is an image diagram of an example of the record viewing and editing screen after scrolling. The record viewing and editing screen 1200 illustrated in FIG. 19 is a screen image after scrolling in which the text and the captured image of the section period identified in step S162 are displayed at the top. In step S174, the screen display unit 40 plays back the voice data from the playback position received in step S170.

According to the flowchart of FIG. 17, the user stops the movement of the "knob" 1244 and then releases the cursor from the "knob" 1244 to display, on the record viewing and editing screen 1200, the text and the captured image of the section period displayed in the tool tip 1230, and to play back the voice data from the section period.

Figure 20:
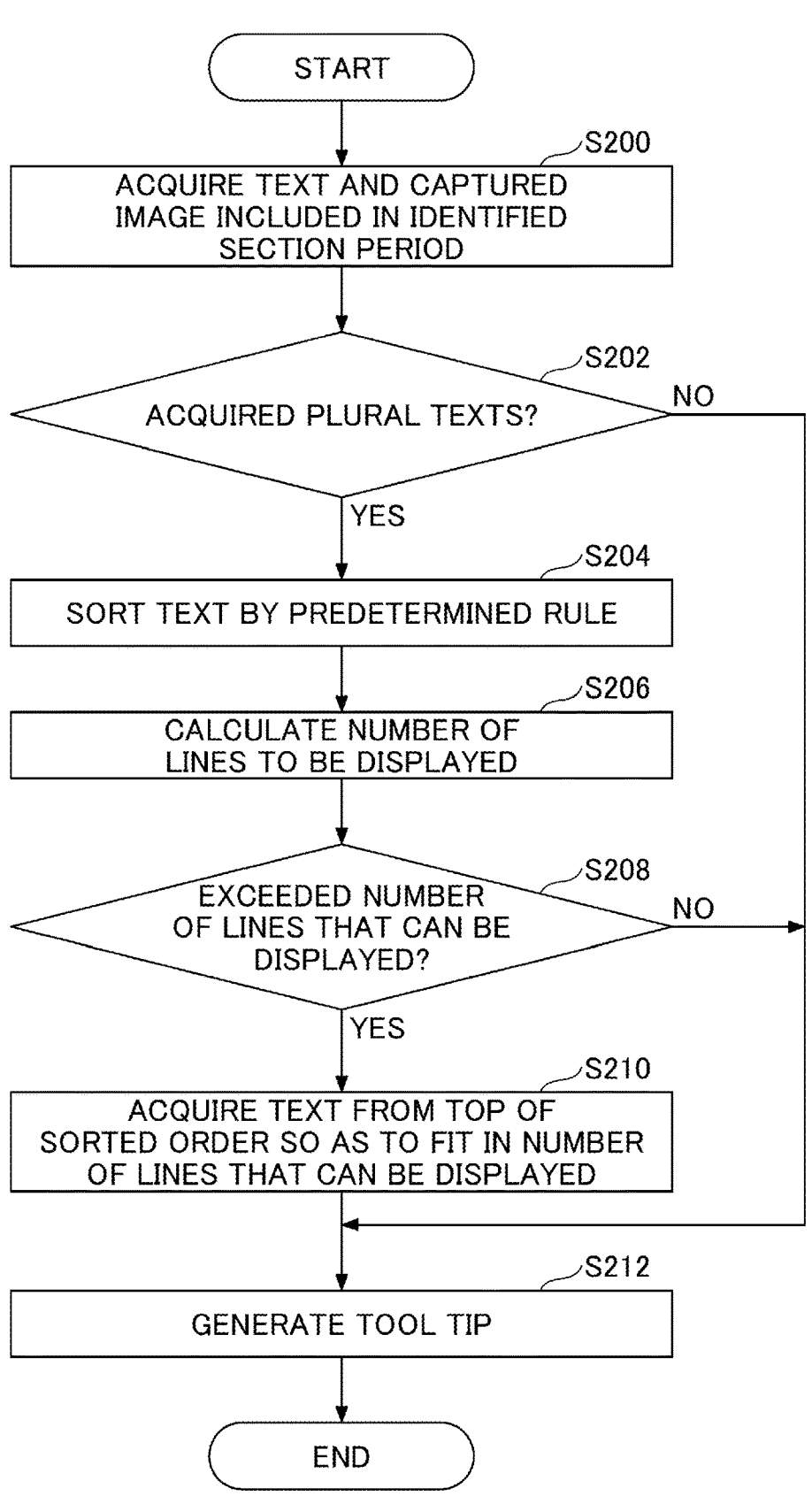
FIG. 20 is a flowchart illustrating an example of tool tip generation processing according to an embodiment of the present invention.

The tool tip generation processing in step S132 of FIG. 14 and the tool tip generation processing in step S152 of FIG. 16 are executed, for example, by the procedure illustrated in FIG. 20. FIG. 20 is a flowchart illustrating an example of the tool tip generation processing.

In step S200, the playback position information display unit 44 of the user terminal 14A of the organizer acquires the text and the captured image included in the identified section period. In step S202, the playback position information display unit 44 determines whether a plurality of texts have been acquired in step S200. When a plurality of texts have not been acquired, the playback position information display unit 44 skips the processing in steps S204 to S210.

When a plurality of texts have been acquired, the display text selecting unit 46 of the user terminal 14A of the organizer sorts the texts by a predetermined rule in step S204. FIG. 21 is an explanatory diagram of an example of the texts acquired in step S200. FIG. 22 is an explanatory diagram of examples of predetermined rules.

FIG. 22 illustrates, as examples of predetermined rules, a sort rule based on the number of characters, a sort rule which gives priority to the bookmarked text, a sort rule which gives priority to the text with track changes, a sort rule based on the order of closeness to content of the conference memo, and a sort rule based on a combination of the above sort rules.

The sort rule based on the number of characters is a rule which arranges the texts, which are voice recognition results, in a descending order according to the number of characters. The sort rule which gives priority to the bookmarked text is a rule which arranges the bookmarked texts in a descending order according to the number of characters and further arranges the non-bookmarked texts in a descending order according to the number of characters.

The sort rule which gives priority to the text with the track changes is a rule which arranges the texts with track changes in a descending order according to the number of characters and further arranges the text without track changes in a descending order according to the number of characters. The sort rule according to the order of closeness to content of the conference memo is a rule which analyzes the text of the "conference memo" of the record bibliographic information illustrated in FIG. 5 and each text of the voice recognition result, and arranges each text of the voice recognition result in the order of closeness to content of the "conference memo".

The sort rule according to the combination of the above sort rules is a rule which arranges each text by the rule of the next priority order when there are multiple texts of the same priority order in a specific rule based on the priority order of each rule.

In step S206, the display text selecting unit 46 calculates the number of display lines in the tool tip 1230 of the text included in the identified section period. The number of lines that can be displayed is set in the tool tip 1230.

In step S208, the display text selecting unit 46 determines whether the number of display lines calculated in step S206 exceeds the number of lines that can be displayed in the tool tip 1230. When it is determined that the number of lines that can be displayed is not exceeded, the display text selecting unit 46 skips the processing in step S210.

When it is determined that the number of lines that can be displayed is exceeded, the display text selecting unit 46 acquires, in step S210, the text from the top of the sort order in step S204 so as to fit in the number of lines that can be displayed in the tool tip 1230. In step S212, the playback position information display unit 44 generates a tool tip so that the text selected by the display text selecting unit 46 in step S210 is displayed. The tool tip generated in step S212 changes according to the sort rule as illustrated in the result item of FIG. 22.

According to the present embodiment, the text of the voice generated from the playback position can be displayed on the tool tip 1230 in accordance with the operation of identifying the playback position by the user, thereby improving convenience when the user identifies the playback position.

Other Embodiment

Figure 23:
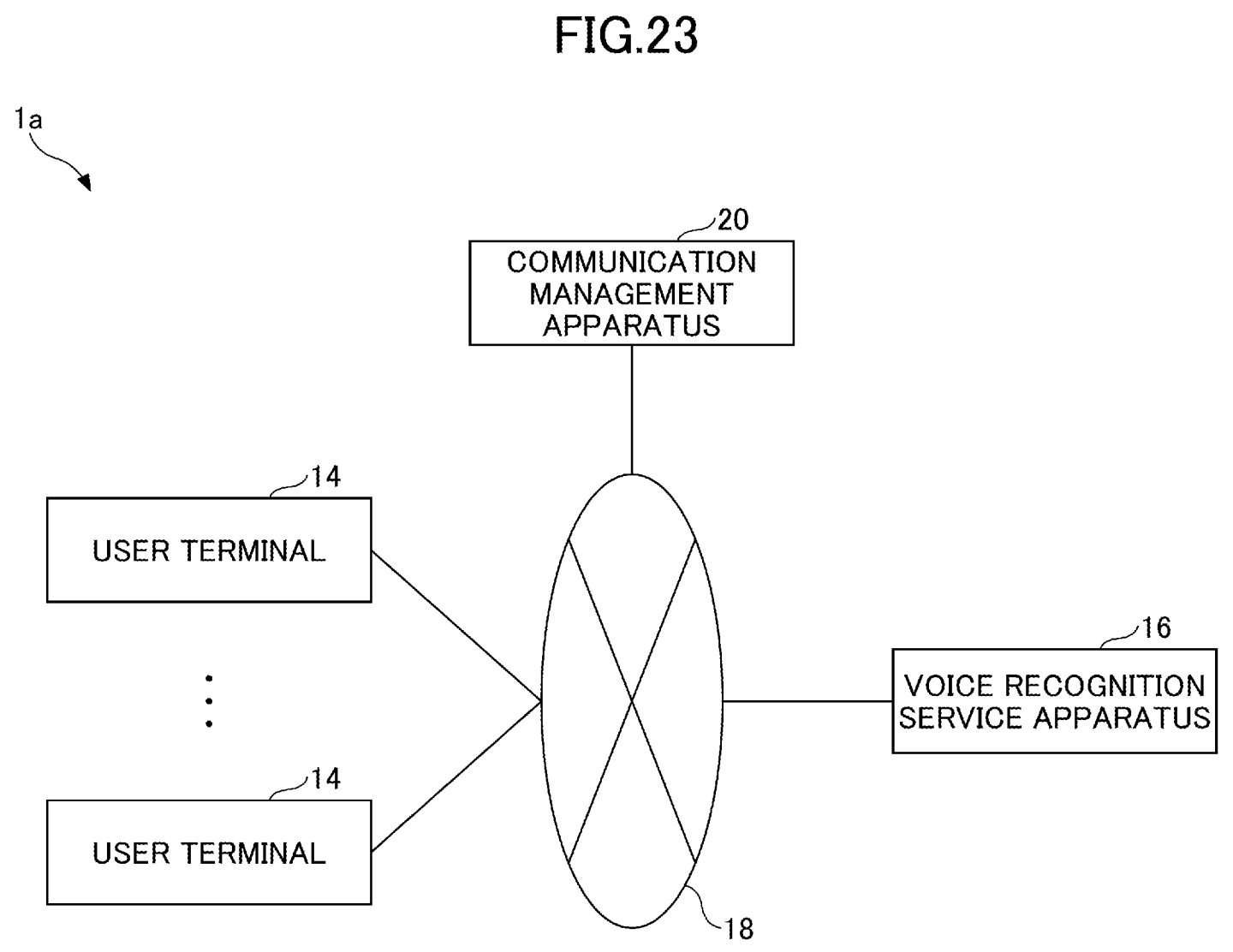

The information processing system 1 of FIG. 1 is an example, and may be configured as illustrated in FIG. 23. FIG. 23 is a functional configuration diagram of an example of an information processing system according to the present embodiment. In an information processing system 1a of FIG. 23, the voice recording management apparatus 10 and the online conference service apparatus 12 of FIG. 1 are replaced by a communication management apparatus 20.

Figure 24:
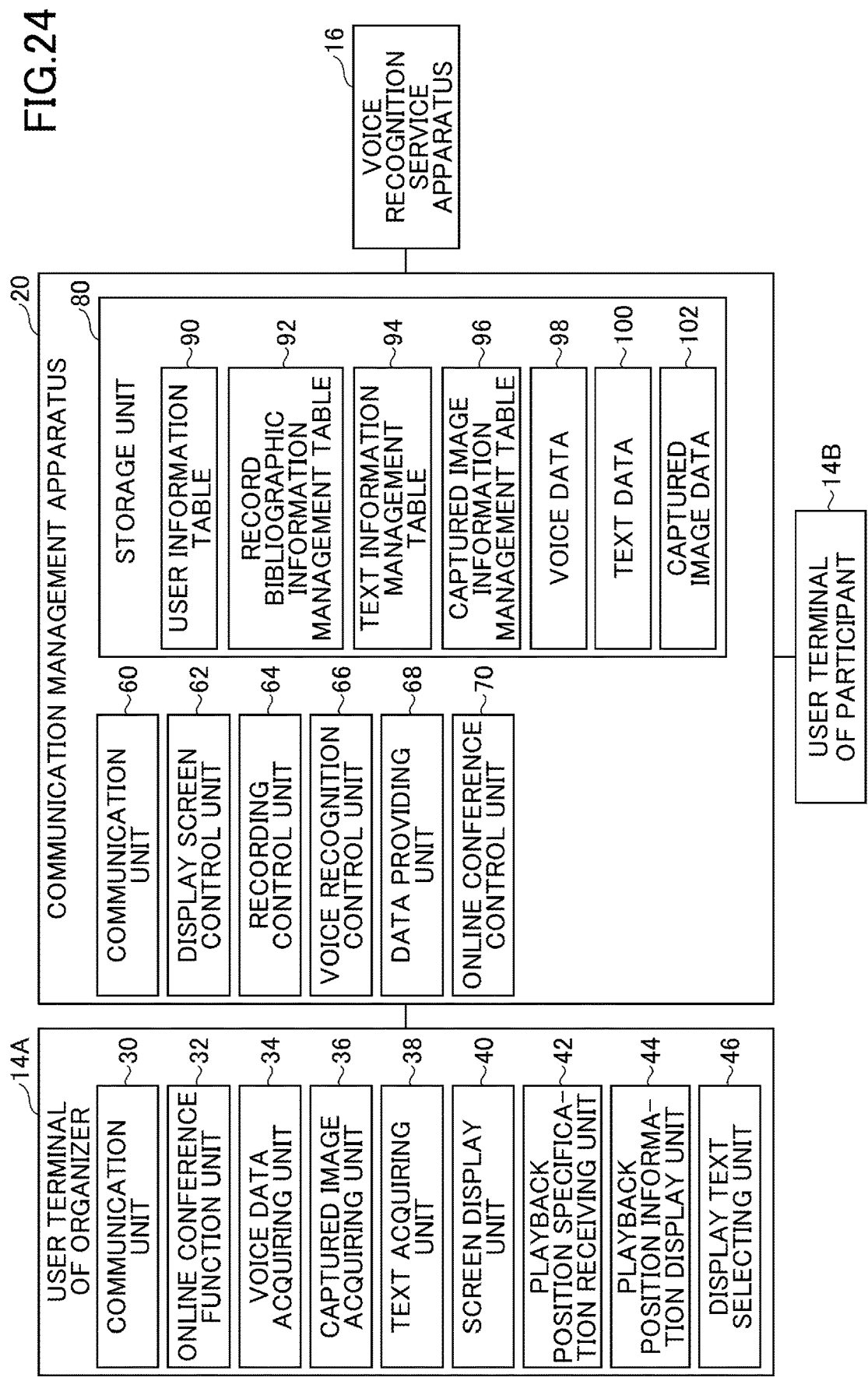
FIG. 24 is a functional configuration diagram of an example of an information processing system according to an embodiment of the present invention.

The communication management apparatus 20 has the functions of the voice recording management apparatus 10 and the online conference service apparatus 12 of FIG. 1. FIG. 24 is a functional configuration diagram of an example of an information processing system according to the present embodiment. The functional configuration of the communication management apparatus 20 illustrated in FIG. 24 is a configuration in which an online conference control unit 70 is added to the voice recording management apparatus 10 illustrated in FIG. 4.

Further, the information processing system 1 and the information processing system 1a according to the embodiments can be used for recording voice memos of individuals or groups, the voice history of telephone calls of operators, and voice during specific operations such as at factories, other than online conferences, classes, lectures, or seminars (webinars).

The display of the tool tip 1230 is a function used by the user when searching for a playback position, and is likely to be displayed frequently, and, therefore, responsiveness is required. Accordingly, the user terminal 14A of the organizer may acquire text and a captured image in advance in the sequence diagrams of FIGS. 14 and 16 to enhance responsiveness in generating the tool tip 1230.

Further, the user terminal 14A of the organizer may prioritize acquiring text and a captured image in the identified section period in the sequence diagrams of FIGS. 14 and 16, and acquire the remaining text and the captured image in parallel with the generating of the tool tip 1230.

Further, the information processing system 1 of FIG. 4 may provide the user terminal 14A of the organizer with the function provided by the voice recording management apparatus 10 in FIG. 4, or may provide the voice recording management apparatus 10 with the function provided by the user terminal 14A of the organizer.

The recording medium, the information processing apparatus, and the information processing method are not limited to the specific embodiments described in the detailed description, and variations and modifications may be made without departing from the spirit and scope of the present invention. Note that the information processing system 1 and the information processing system 1a described in the embodiments are examples, and there are various examples of system configurations depending on the application and purpose.

The functions of each of the embodiments described above may be implemented by one or more processing circuits. As used herein, a "processing circuit" includes a processor programmed to execute each function by software such as a processor implemented in an electronic circuit; or devices such as an Application Specific Integrated Circuit (ASIC), a digital signal processor (DSP), a field programmable gate array (FPGA), and a conventional circuit module, designed to execute each function as described above.

Also, the apparatus group described in the examples are merely indicative of one of a plurality of computing environments for carrying out the embodiments disclosed herein. In some embodiments, the voice recording management apparatus 10 and the communication management apparatus 20 include a plurality of computing devices, such as server clusters. The plurality of computing devices are configured to communicate with each other via any type of communication link, including the communication network 18, a shared memory, and the like, and perform the processes disclosed herein.

Further, the voice recording management apparatus 10 and the communication management apparatus 20 can be configured to share the disclosed processing steps in various combinations. For example, processes performed by a given unit can be performed by other units.

According to one embodiment of the present invention, convenience when a user specifies a playback position can be improved.

Aspects of the present invention are, for example, as follows.

<1>

A non-transitory computer-readable recording medium storing a program that causes a computer to execute a process performed in an information processing apparatus that plays back voice data, the process including:

receiving, from a user, an operation of specifying a playback position of the voice data; and displaying a text of a voice to be played back from the playback position, based on the operation of specifying the playback position.

<2>

The non-transitory computer-readable recording medium according to <1>, wherein the displaying includes displaying, together with the text of the voice to be played back from the playback position, a captured image corresponding to the playback position based on the operation of specifying the playback position, the captured image being obtained by capturing a screen recorded together with the voice data.

<3>

The non-transitory computer-readable recording medium according to <1> or <2>, the process further comprising:

selecting, according to a rule, the text of the voice to be displayed based on the operation of specifying the playback position, from among the texts of a plurality of the voices included in a section period corresponding to the playback position.

<4>

The non-transitory computer-readable recording medium according to any one of <1> to <3>, wherein the operation of specifying the playback position is an operation by the user of specifying a position on a display element of a graphical user interface that displays the playback position and receives the operation of specifying the playback position, and the displaying includes displaying the text of the voice to be played back from the playback position, in a display area that appears according to the operation by the user of specifying the position on the display element.

<5>

The non-transitory computer-readable recording medium according to any one of <1> to <4>, wherein the operation of specifying the playback position is an operation by the user of moving a display component that receives the operation of specifying the playback position on a display element of a graphical user interface that displays the playback position and receives the operation of specifying the playback position, and the displaying includes displaying the text of the voice to be played back from the playback position, in a display area that appears according to the operation by the user of moving a position of the display component.

<6>

The non-transitory computer-readable recording medium according to any one of <1> to <5>, the process further comprising:

displaying a record viewing and editing screen in which the text of the voice to be played back by the voice data and a captured image obtained by capturing a screen recorded together with the voice data are associated with each other, wherein the receiving includes receiving, from the record viewing and editing screen, the operation by the user of specifying the playback position of the voice data.

<7>

The non-transitory computer-readable recording medium according to any one of <1> to <6>, the process further comprising:

acquiring the voice data;

acquiring a captured image obtained by capturing a screen corresponding to the voice data; and acquiring the text of the voice of a voice recognition result obtained from the voice data.

<8>

The non-transitory computer-readable recording medium according to <7>, wherein the acquiring of the voice data includes acquiring the voice data of speech of a plurality of users, and the acquiring of the captured image includes acquiring the captured image of the screen shared by the plurality of users.

<9>

The non-transitory computer-readable recording medium according to <8>, wherein the acquiring of the voice data includes acquiring the voice data of the speech of the plurality of users, from a function by which the plurality of users perform voice communication and screen sharing, and the acquiring of the captured image includes acquiring, from the function, the captured image of the screen shared by the plurality of users.

<10>

The non-transitory computer-readable recording medium according to any one of <1> to <9>, wherein the displaying includes acquiring the text of the voice corresponding to the specified playback position, based on an association relationship between the playback position stored in a storage and the text of the voice, and displaying the text of the voice to be played back from the playback position based on the operation of specifying the playback position.

<11>

An information processing apparatus that plays back voice data, the information processing apparatus including:
circuitry; and
a memory storing computer-executable instructions that cause the circuitry to execute:
receiving, from a user, an operation of specifying a playback position of the voice data; and
displaying a text of a voice to be played back from the playback position, based on the operation of specifying the playback position.

<12>

An information processing method executed by an information processing apparatus that plays back voice data, the information processing method including:
receiving, from a user, an operation of specifying a playback position of the voice data; and
displaying a text of a voice to be played back from the playback position, based on the operation of specifying the playback position.

<13>

An information processing system in which a user terminal and a server apparatus are communicably connect to each other, wherein
the user terminal includes:
first circuitry; and
a first memory storing computer-executable instructions that cause the first circuitry to execute:
receiving, from a user, an operation of specifying a playback position of voice data obtained by recording speech by a plurality of speakers; and
displaying a text of a voice to be played back from the playback position, based on the operation of specifying the playback position, and wherein
the server apparatus includes:
second circuitry; and
a second memory storing computer-executable instructions that cause the second circuitry to execute:
recording the voice data and the text; and
providing the voice data and the text to the user terminal.

What is claimed is:

1. A non-transitory computer-readable recording medium storing a program that causes a computer to execute a process performed in an information processing apparatus that plays back voice data, the process comprising:
receiving, from a user, an operation of specifying a playback position of the voice data on a seek bar using a cursor;
detecting a cursor position on the seek bar;
determining a time section corresponding to the detected cursor position;
transmitting, to a server, a request for text data and image data associated with the time section;
receiving, from the server, the text data and the image data; and displaying, on the seek bar, a tool tip configured to temporarily display the text data and the image data corresponding to the time section associated with the playback position.

2. The non-transitory computer-readable recording medium according to claim 1, wherein the displaying includes displaying, together with the text data to be displayed, the image data corresponding to the time section determined based on the operation of specifying the playback position, the image data being obtained by capturing a screen recorded together with the voice data.

3. The non-transitory computer-readable recording medium according to claim 1, the process further comprising:
selecting, according to a rule, the text data to be displayed from among texts of a plurality of voices included in the time section corresponding to the detected cursor position.

4. The non-transitory computer-readable recording medium according to claim 1, wherein
the operation of specifying the playback position is an operation by the user of specifying a position on a display element of a graphical user interface that displays the playback position and receives the operation of specifying the playback position, and
the displaying includes displaying the text data, in a display area that appears according to the operation by the user of specifying the position on the display element.

5. The non-transitory computer-readable recording medium according to claim 1, wherein
the operation of specifying the playback position is an operation by the user of moving a display component that receives the operation of specifying the playback position on a display element of a graphical user interface that displays the playback position and receives the operation of specifying the playback position, and
the displaying includes displaying the text data, in a display area that appears according to the operation by the user of moving a position of the display component.

6. The non-transitory computer-readable recording medium according to claim 1, the process further comprising:
displaying a record viewing and editing screen in which the text data and the image data obtained by capturing a screen recorded together with the voice data are associated with each other, wherein
the receiving includes receiving, from the record viewing and editing screen, the operation by the user of specifying the playback position of the voice data.

7. The non-transitory computer-readable recording medium according to claim 1, the process further comprising:
acquiring the voice data;
acquiring the image data obtained by capturing a screen corresponding to the voice data; and
acquiring the text data of a voice recognition result obtained from the voice data.

8. The non-transitory computer-readable recording medium according to claim 7, wherein
the voice data corresponds to speech by a plurality of users, and
the image data corresponds to the captured screen shared by the plurality of users.

9. The non-transitory computer-readable recording medium according to claim 8, wherein the voice data is acquired from a function by which the plurality of users perform voice communication and screen sharing, and the image data is acquired, from the function, for the captured screen shared by the plurality of users.

10. The non-transitory computer-readable recording medium according to claim 1, wherein the displaying includes acquiring the text data corresponding to the time section determined based on the cursor position, and displaying the text data in the tool tip based on the operation of specifying the playback position.

11. An information processing apparatus that plays back voice data, the information processing apparatus comprising:

circuitry; and a memory storing computer-executable instructions that cause the circuitry to execute:

receiving, from a user, an operation of specifying a playback position of the voice data on a seek bar using a cursor;

detecting a cursor position on the seek bar;

determining a time section corresponding to the detected cursor position;

transmitting, to a server, a request for text data and image data associated with the time section;

receiving, from the server, the text data and the image data; and displaying, on the seek bar, a tool tip configured to temporarily display the text data and the image data corresponding to the time section associated with the playback position.

12. An information processing method executed by an information processing apparatus that plays back voice data, the information processing method comprising:

receiving, from a user, an operation of specifying a playback position of the voice data on a seek bar using a cursor;

detecting a cursor position on the seek bar;

determining a time section corresponding to the detected cursor position;

transmitting, to a server, a request for text data and image data associated with the time section;

receiving, from the server, the text data and the image data; and displaying, on the seek bar, a tool tip configured to temporarily display the text data and the image data corresponding to the time section associated with the playback position.

* * * * *